(12) United States Patent
Yang et al.

(10) Patent No.: US 12,077,648 B2
(45) Date of Patent: Sep. 3, 2024

(54) FIBER-REINFORCED ORGANIC POLYMER AEROGEL

(71) Applicant: BLUESHIFT MATERIALS, INC., Spencer, MA (US)

(72) Inventors: Liu Yang, Glasgow (GB); Ashleigh Fletcher, Glasgow (GB); Stewart Taylor, Glasgow (GB); Fiona Sillars, Glasgow (GB); David Nash, Glasgow (GB); Andrew Webley, Glasgow (GB); Garrett Poe, Spencer, MA (US)

(73) Assignee: BLUESHIFT MATERIALS, INC., Spencer, MA (US)

( * ) Notice: Subject to any disclaimer, the term of this patent is extended or adjusted under 35 U.S.C. 154(b) by 0 days.

(21) Appl. No.: 17/728,216

(22) Filed: Apr. 25, 2022

(65) Prior Publication Data

US 2022/0325060 A1  Oct. 13, 2022

Related U.S. Application Data

(63) Continuation of application No. 17/061,992, filed on Oct. 2, 2020, now Pat. No. 11,345,792, which is a
(Continued)

(51) Int. Cl.
*C08J 9/00* (2006.01)
*B01J 13/00* (2006.01)
(Continued)

(52) U.S. Cl.
CPC ......... *C08J 9/0085* (2013.01); *B01J 13/0091* (2013.01); *C08J 5/04* (2013.01);
(Continued)

(58) Field of Classification Search
CPC ... C08J 9/0085; C08J 5/04; C08J 5/043; C08J 5/046; C08J 5/24; C08J 9/286;
(Continued)

(56) References Cited

U.S. PATENT DOCUMENTS

| | | |
|---|---|---|
| 5,705,535 A | 1/1998 | Jansen et al. |
| 8,214,980 B2 | 7/2012 | Bullock et al. |

(Continued)

FOREIGN PATENT DOCUMENTS

| | | |
|---|---|---|
| CN | 102285775 | 12/2011 |
| CN | 102459079 | 5/2012 |

(Continued)

OTHER PUBLICATIONS

Translation of DE-102012218548-A1 (Year: 2014).*
(Continued)

*Primary Examiner* — Brent T O'Hern
(74) *Attorney, Agent, or Firm* — NORTON ROSE FULBRIGHT US LLP

(57) ABSTRACT

A fiber-reinforced aerogel is disclosed. The aerogel can include a porous organic polymer matrix and fibers included in the porous organic polymer matrix. The aerogel can include a thermal conductivity of less than or equal to 60 mW/m·K at a temperature of 20° C., at least a bimodal pore size distribution with a first mode of pores having an average pore size of less than or equal to 50 nanometers (nm) and a second mode of pores having an average pore size of greater than 50 nm, and a planar shape having a thickness of 5 millimeters (mm) or less and is capable of being rolled up into a roll, wherein the fibers form a woven fiber matrix.

21 Claims, 9 Drawing Sheets

Related U.S. Application Data continuation of application No. 16/344,332, filed as application No. PCT/IB2017/056575 on Oct. 23, 2017, now Pat. No. 10,836,880.

(60) Provisional application No. 62/412,145, filed on Oct. 24, 2016.

(51) Int. Cl.
| | |
|---|---|
| *C08J 5/04* | (2006.01) |
| *C08J 5/24* | (2006.01) |
| *C08J 9/28* | (2006.01) |
| *C08L 61/12* | (2006.01) |
| *C08L 79/08* | (2006.01) |
| *F16L 59/02* | (2006.01) |

(52) U.S. Cl.
CPC ............... *C08J 5/043* (2013.01); *C08J 5/046* (2013.01); *C08J 5/24* (2013.01); *C08J 9/286* (2013.01); *C08L 61/12* (2013.01); *C08L 79/08* (2013.01); *F16L 59/028* (2013.01); *C08J 2201/0504* (2013.01); *C08J 2205/026* (2013.01); *C08J 2205/042* (2013.01); *C08J 2205/044* (2013.01); *C08J 2205/048* (2013.01); *C08J 2361/12* (2013.01); *C08J 2379/08* (2013.01); *C08J 2429/04* (2013.01); *C08J 2467/00* (2013.01); *C08L 2203/14* (2013.01); *C08L 2205/16* (2013.01)

(58) Field of Classification Search
CPC .......... C08J 2201/0504; C08J 2205/026; C08J 2205/042; C08J 2205/044; C08J 2205/048; C08J 2361/12; C08J 2379/08; C08J 2429/04; C08J 2467/00; B01J 13/0091; C08L 61/12; C08L 79/08; C08L 2203/14; C08L 2205/16; F16L 59/028
USPC ........................................................ 428/219
See application file for complete search history.

(56) References Cited

U.S. PATENT DOCUMENTS

| | | | |
|---|---|---|---|
| 8,637,582 | B2 | 1/2014 | Gawryla et al. |
| 9,434,832 | B1 | 9/2016 | Meador |
| 2002/0094426 | A1 | 7/2002 | Stepanian et al. |
| 2003/0212152 | A1* | 11/2003 | Ratke ........................ B22C 1/00 521/50 |
| 2010/0204347 | A1 | 8/2010 | Park et al. |
| 2014/0148560 | A1 | 5/2014 | Qureshi et al. |
| 2015/0017860 | A1 | 1/2015 | Bullock et al. |

FOREIGN PATENT DOCUMENTS

| | | | |
|---|---|---|---|
| DE | 10300979 | 7/2004 | |
| DE | 102004047552 | 4/2006 | |
| DE | 102012218548 | 4/2014 | |
| DE | 102012218548 A1 * | 4/2014 | ............. C01B 32/00 |
| EP | 3053952 | 8/2016 | |
| WO | WO 2015/121541 | 8/2015 | |
| WO | WO 2018/078512 B1 | 5/2018 | |

OTHER PUBLICATIONS

International Search Report and Written Opinion issued in Corresponding International Patent Application No. PCT/US2018/015568, dated Apr. 24, 2018.
International Search Report and Written Opinion issued in International Patent Application No. PCT/IB2017/056575, dated Feb. 21, 2018.
Office Action issued in Corresponding Chinese Application No. 201780080187.2, dated Jun. 11, 2021 (English Translation provided).
Search Report issued in Corresponding Chinese Application No. 201780080187.2, dated Jun. 7, 2021 (English Translation provided).
Office Action issued in Corresponding Canadian Application No. 3,041,419, dated Oct. 19, 2023.

* cited by examiner

FIBER-REINFORCED ORGANIC POLYMER AEROGEL

CROSS-REFERENCE TO RELATED APPLICATIONS

This application is a continuation of U.S. application Ser. No. 17/061,992, filed Oct. 2, 2020, which is a continuation of U.S. application Ser. No. 16/344,332, filed Apr. 23, 2019 (now U.S. Pat. No. 10,836,880), which claims benefit to U.S. Provisional Application No. 62/412,145, filed Oct. 24, 2016. The referenced applications are incorporated into the present application by reference.

BACKGROUND OF THE INVENTION

A. Field of the Invention

The present disclosure relates to the field of aerogels. In particular, the invention concerns a fiber-reinforced organic polymer aerogel having at least bimodal pore size distribution with a first mode of pores having an average pore size of less than or equal to 50 nanometers (nm) and a second mode of pores having an average pore size of greater than 50 nm.

B. Description of Related Art

An aerogel is a porous solid that is formed from a gel, in which the liquid that fills the pores of the gel has been replaced with a gas (e.g., air). Shrinkage of the gel's solid network during drying is negligible or altogether prevented due to the minimization of or resistance to the capillary forces acting on the network as the liquid is removed. In order to prevent shrinking during drying, however, time consuming, expensive, and/or complicated processes are typically used such as freeze-drying or super-critical drying (See, U.S. Pat. No. 5,705,535). The dried aerogel network is typically comprised of inorganic particles (e.g., silica-based, titania-based, zirconia-based, alumina-based, hafnia-based, yttria-based, or ceria-based aerogels) or polymer particles (polymer-based aerogels) (See, U.S. Patent Application Publication No. 2015/0017860). These aerogels are generally characterized as having high porosity (about 94-99%), single-mode pore size distribution, low density, and high specific surface area. High porosity confers a number of useful properties to aerogels, including high surface area, low refractive index, low dielectric constant, low thermal-loss coefficient, and low sound velocity.

However, conventional aerogels lack mechanical durability. The lack of durability can have a negative impact on production scale-up, large scale manufacturing, conformation to irregular surfaces, or maintaining integrity in dynamic conditions. Recent efforts to improve upon the durability of aerogels, while still maintaining good thermal and flexible properties, have been focused on internally reinforcing aerogels. For example, U.S. Patent Application Publication No. 2002/0094426 discloses reinforced aerogel blankets that use fibers in the form of a lofty batting to reinforce the aerogel. In other examples, U.S. Patent Application Publication No. 2015/0017860 and U.S. Pat. No. 8,214,980, each disclose the use of woven and non-woven fibrous materials to support aerogels. It is believed that these and other currently available fiber-reinforced aerogels have a single-mode pore size distribution in the solid aerogel network, which may influence the mechanical properties, causing the aerogels to become more brittle than desired, which can cause aerogel-fiber adhesion problems, dusting, and handling issues. Further, complicated drying processes (e.g., super-critical drying) are needed to prevent the aerogel network from collapsing.

The currently available silica-based fiber-reinforced aerogels use fiber materials for reinforcement that are themselves mechanically weak and of low density. This is done in an attempt to avoid breaking and dusting of the aerogel matrix by the fiber material when wrapping the aerogel around an object to be insulated (a pipe, for instance). A stronger fiber material can cause damage to the relatively weak silica-based aerogel. The weakness of the fiber material and silica aerogels results in an overall weak fiber-reinforced polymer aerogel.

SUMMARY OF THE INVENTION

A discovery has been made that provides a solution to the aforementioned problems associated with currently-available fiber-reinforced aerogels. The discovery is premised on the creation of a multi-modal pore size distribution (i.e., a pore size distribution having at least two modes of pore size) throughout the solid or dried aerogel network, and using relatively strong fiber materials to reinforce an organic polymer aerogel matrix. In particular, the solid aerogel network can have at least two distinct populations of pore sizes, one with an average diameter smaller than 50 nm, and one with an average diameter larger than 50 nm. In some instances, a trimodal pore size distribution can be created where the third pore size mode has an average diameter of greater than 1 micron (μm). Without wishing to be bound by theory, it is believed that the multi-modal pore size structure of the aerogel network is created by particular polymers (e.g., resorcinol formaldehyde) and fibers (e.g., non-woven polyester fibers) that can cause different nucleation events of the solubilized polymers during the formation of the gel-network. By way of example, and without wishing to be bound by theory, resorcinol formaldehyde can cross-link during processing, which can serve to limit the size of some of the resulting particles, while the presence of the fibers can provide different nucleation events resulting in polymer particles with varying sizes. This can result in a gelled-network of polymer particles with different sizes. Once the liquid-phase is removed via drying, the resulting aerogel network has a multi-modal pore size distribution due to the different polymer particle sizes present in the solid aerogel network. Notably, the presence of varying particle sizes in the gel can help prevent network collapse during drying, which allows the aerogels of the present invention to be produced by processes such as thermal drying or evaporative air drying in addition to the more commonly used freeze-drying and super-critical drying processes. The use of thermal and/or evaporative air drying provides for a more cost- and time-efficient process that can be scalable to meet large scale manufacturing needs. Even further, the presence of the multi-modal pore structure can help reduce the thermal conductivity of the fiber-reinforced aerogels of the present invention to less than or equal to 30 mW/m·K at a temperature of 20° C. The fiber-reinforced organic polymer aerogels disclosed herein have superior mechanical properties to prior art fiber-reinforced aerogels. Mechanically strong fiber materials are used, and, surprisingly, the fiber materials do not negatively impact thermal conductivity. The combination of the strong fiber materials and the organic polymer aerogel matrices herein results in aerogels that are much stronger and less compressible than currently available reinforced aerogels, while maintaining good thermal properties. Notably, and as exemplified in the Examples, the fiber-reinforced organic polymer aerogel has less weight loss when used (e.g., pipe wrapping) as compared to commercially available silica gel aerogels. In some embodiments, the fiber-reinforced organic polymer aerogel can have a weight loss of less than 0.5%, less than 0.4%, less than 0.3%, less than 0.2%, less than 0.1% during handling.

Disclosed herein is a fiber-reinforced organic polymer aerogel comprising a non-fibrous organic polymer matrix and fibers comprised in the non-fibrous organic polymer matrix. The aerogel comprises a thermal conductivity of less than or equal to 30 mW/m·K at a temperature of 20° C. and has an at least bimodal pore size distribution (i.e., a pore size distribution having at least two modes) with a first mode of pores having an average pore size of less than or equal to 50 nm and a second mode of pores having an average pore size of greater than 50 nm. In some embodiments, the fiber-reinforced organic polymer aerogel has a first mode of pores with an average pore size from 3 nm to 50 nm and a second mode of pores with an average pore size from 50 nm to 10 µm. In some embodiments, the fiber-reinforced organic polymer aerogel has a trimodal pore size distribution, where a first mode of pores has an average pore size of 3 nm to 50 nm, a second mode of pores has an average pore size of 50 nm to 10 micron (µm, 10,000 nm), and a third mode of pores has an average pore size of greater than 10 µm. In particularly preferred embodiments, the polymer matrix of the aerogel is a resorcinol formaldehyde polymer matrix and the fibers are non-woven polyester fibers. In some embodiments, the first mode of pores have an average pore size greater than, equal to, or between any two of 3 nm, 5 nm, 10 nm, 15 nm, 20 nm, 25 nm, 30 nm, 35 nm, 40 nm, 45 nm, and 50 nm. The second mode of pores can be greater than, equal to, or between any two of 50, 100, 200, 300, 400, 500, 600, 700, 800, 900, 1000, 5000, 10,000 nm.

In some embodiments, the fiber-reinforced organic polymer aerogel has a weight ratio of the organic polymer matrix to the fibers of 50 to 65. In some embodiments, the weight ratio is 40, 45, 50, 55, 60, 65, 70, 75, 80, or 85 or is between any two of those values. The fiber-reinforced organic polymer aerogel can have a non-fibrous organic polymer matrix that can include resorcinol formaldehyde, phenol formaldehyde, polyimide, polyamine, polyamide, poly(amide-imide), poly(amic amide), poly(ether imide), polyphenol, polyalcohol, polyvinyl butryal, polyurethane, polyurea, polycarbonate, polyester, polyether, polyacid, or any combination thereof. Other suitable non-fibrous organic polymer materials are known to those of skill in the art. In some embodiments, it is contemplated that silica-based and other inorganic-based aerogels are not used in the fiber-reinforced polymer aerogels of the present invention. In some embodiments, the non-fibrous organic polymer matrix comprises or consists of resorcinol formaldehyde or polyimide. In some embodiments, the non-fibrous organic polymer matrix is a resorcinol formaldehyde polymer matrix. In some embodiments, the non-fibrous organic polymer matrix is a cross-linked organic polymer matrix.

The fibers comprised in the non-fibrous polymer matrix can be natural, synthetic, semi-synthetic fibers, or combinations thereof. The fibers can comprise vegetable, wood, animal, mineral, biological fibers, or combinations thereof. In some particular instances, the fibers can comprise rayon, bamboo, diacetate, triacetate fibers, polyester fibers, aramid fibers, or combinations thereof. In some embodiments, the fibers comprise metal fibers, carbon fibers, carbide fibers, glass fibers, mineral fibers, basalt fibers, or combinations thereof. In some embodiments, the fibers comprise thermoplastic polymer fibers, thermoset polymer fibers, or combinations thereof. Non-limiting examples of thermoplastic fibers includes fibers of polyethylene terephthalate (PET), a polycarbonate (PC) family of polymers, polybutylene terephthalate (PBT), poly(1,4-cyclohexylidene cyclohexane-1, 4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof. Non-limiting examples of thermoset fibers include a fiber of polyaramid, polyimide, polybenzoxazole, polyurethane, or blends thereof. In some embodiments, the fibers are polyaramid, polyimide, polybenzoxazole, polyurethane, or blends thereof. In some embodiments, the fibers are vinylon. In some embodiments, the fibers are polyester fibers. In some embodiments, the fibers are non-woven. In some embodiments, the fibers form a fiber matrix. In some embodiments, the fiber matrix is distributed throughout the non-fibrous organic polymer matrix. In some embodiments, the fibers have an average filament cross sectional area of 5 µm$^2$ to 40,000 µm$^2$ and an average length of 20 mm to 100 mm. In some embodiments, the cross sectional area is 5, 10, 15, 20, 25, 50, 100, 150, 200, 250, 300, 350, 400, 450, or 500 µm$^2$ or between any two of those values. In some embodiments, the fibers have an average length of approximately 0.1, 0.2, 0.3, 0.4, 0.5, 1, 2, 3, 4, 5, 6, 7, 8, 9, 10, 20, 30, 40, 50, 60, 70, 80, 90, 100, 150, 200, 250, 300, 350, 400, 450, 500, 600, 700, 800, 900, 1000, 1500, 2000, 3000, 4000, 5000 mm or between any two of those values. In some embodiments, the fiber matrix comprises felt, batting, non-woven fabric, or a mat.

In some embodiments, the fiber-reinforced organic polymer aerogels described herein have a thermal conductivity less than or equal to 30 mW/m·K at temperatures below, up to, or at 150° C. In some embodiments the thermal conductivity is less than or equal to 35 mW/m·K at temperatures below, up to, or at 200° C. In some embodiments, the thermal conductivity is about 10, 11, 12, 13, 14, 15, 16, 17, 18, 19, 20, 21, 22, 23, 24, 25, 26, 27, 28, 29, 30, 31, 32, 33, 34, or 35 mW/m·K or is between any of these values at temperatures below, up to, or at 150° C. or below, up to, or at 200° C. In some embodiments, the thermal conductivity is about 10, 11, 12, 13, 14, 15, 16, 17, 18, 19, 20, 21, 22, 23, 24, 25, 26, 27, 28, 29, 30, 31, 32, 33, 34, or 35 mW/m·K or is between any of these values at temperatures of −200, −150, −100, −50, −20, −10, 0, 10, 20, 30, 40, 50, 60, 70, 80, 90, 100, 110, 120, 130, 140, 150, 160, 170, 180, 190, or 200° C. or at temperatures below any of those values or between any two of those values.

In some embodiments, the fiber-reinforced organic polymer aerogels described herein have a density of less than 0.5 g/cm$^3$ or less than 0.25 g/cm$^3$ or from 0.1 g/cm$^3$ to 0.5 g/cm$^3$ or from 0.2 g/cm$^3$ to 0.25 g/cm$^3$. In some embodiments, the fiber-reinforced organic polymer aerogel has a density of 0.1, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, or 0.40 g/cm$^3$ or between any two of those values.

In some embodiments, the fiber-reinforced organic polymer aerogels described herein have a pore volume of greater than 2 cm$^3$/g or of 2.0, 2.1, 2.2, 2.3, 2.4, 2.5, 2.6, 2.7, 2.8, 2.9, or 3.0 cm$^3$/g or between any two of those values.

In some embodiments, the fiber-reinforced organic polymer aerogels described herein have a surface area of at least 150 m$^2$/g or of 50, 75, 100, 125, 150, 200, 210, 220, 230, 240, 250, 260, 270, 280, 290, or 300 m$^2$/g or between any two of those values.

In some embodiments, the fiber-reinforced organic polymer aerogels described herein can have a substantially planar shape and have a thickness of 0.5 mm to 25 mm. In some embodiments, the thickness is approximately 0.5, 1, 2, 3, 4, 5, 10, 15, 20, 25, 30, 35, 40, 45, 50, 60, 70, 80, 90, 100, 200, 300, 400, 500, 600, 700, 800, 900, or 1000 mm or between any two of those values. In some embodiments, the aerogel has a thickness of 1, 2, 3, 4, 5, 6, 7, 8, 9, or 10 mm or between any of those values.

In some embodiments, the fiber-reinforced organic polymer aerogels described herein have a tensile strength of at least 2 MPa as measured in either the machine or cross direction. In some embodiments the tensile strength is 1, 1.5, 2, 2.5, 3, 3.5, 4, 4.5, or 5 MPa or is between any two of those values as measured in the machine direction. In some embodiments the tensile strength is 1, 1.5, 2, 2.5, 3, 3.5, 4, 4.5, or 5 MPa or is between any two of those values as measured in the cross direction. In some embodiments, the tensile strength is 1, 1.5, 2, 2.5, 3, 3.5, 4, 4.5, or 5 MPa or is between any two of those values as measured in the machine or cross direction at a temperature of 23° C.

In some embodiments, the fiber-reinforced organic polymer aerogels described herein have a flex fatigue of at least 50,000, 100,000, or 500,000 cycles to failure, or between any two of those values.

Also disclosed is an article of manufacture comprising any of the fiber-reinforced organic polymer aerogels described above. The article of manufacture may be a thin film, monolith, wafer, blanket, core composite material, substrate for radiofrequency antenna, substrate for a sunshield, substrate for a sunshade, substrate for radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus, or any combination thereof. In some embodiments, the article of manufacture is a blanket, which may have a thickness of 5 mm to 10 mm or of about 5, 6, 7, 8, 9, 10, 11, 12, 13, 14, 15, 16, 17, 18, 19, 20, 21, 22, 23, 24, 25, 50, 100, 500, 1000, 1500, 2000, or 3000 mm or between any two of those values.

Also disclosed is a method of making the fiber-reinforced organic polymer aerogels of the present invention. The method can include: a) obtaining fibers; b) obtaining a gel precursor solution that can include a first solvent and a polymer precursor (e.g., one or more monomers); c) combining the fibers and the solution; d) forming a polymer gel from the solution having the fibers included therein; and e) drying the polymer gel to form the fiber-reinforced polymer aerogel having a thermal conductivity of less than or equal to 25 mW/m·K at temperatures below 150° C. and an at least bimodal pore size distribution with a first mode of pores having an average pore size of less than or equal to 50 nm and a second mode of pores having an average pore size of greater than 50 nm. In some embodiment, the step (b) gel precursor solution can further include a catalyst (e.g., calcium carbonate, sodium carbonate or both). The catalyst can include a calcium (Ca) salt and a sodium (Na) salt in a Ca:Na weight ratio of 5:1 to 1:1, preferably 3:1 to 1:1. In some embodiments, the Ca/Na catalyst can catalyst the polymerization of resorcinol and formaldehyde to form a resorcinol formaldehyde polymer matrix. In some embodiments, step (e) can include supercritical drying, subcritical drying, thermal drying, evaporative air drying, or any combination thereof. In particular instances, the drying step (e) can be performed with thermal drying or evaporative air drying without the use of supercritical or subcritical drying. In some preferred instances, step (e) can include evaporative air drying. A benefit of the drying process of the present invention is that it does not require supercritical or subcritical drying to create the aerogel from a wet gel precursor. In some embodiments, the solvent in the solution of step (d) is exchanged with a second solvent having a higher volatility than the first solvent. The formation of the polymer gel in step (d) can result in the formation of polymer particles from polymers that are solubilized in the solution. The polymer particles can have varying particle sizes (e.g., at least two, three, four, or more different sizes), which can result in a gelled network comprised of different particle sizes. Removal of the liquid phase from the gelled network during drying step (e) results in a network of polymer particles with varying sizes with gas (e.g., air) present where the liquid used to be. These different particle sizes produce an aerogel network having a multi-modal (e.g., bimodal or trimodal) pore size distribution, with the fibers present within this polymer particle network.

The following includes definitions of various terms and phrases used throughout this specification.

The term "aerogel" refers to a class of materials that are generally produced by forming a gel, removing a mobile interstitial solvent phase from the pores, and then replacing it with a gas or gas-like material. By controlling the gel and evaporation system, density, shrinkage, and pore collapse can be minimized. In some embodiments, the aerogels of the present invention can have low bulk densities (about 0.25 g/cm$^3$ or less, preferably about 0.01 to 0.5 g/cm$^3$), high surface areas (generally from about 10 to 1,000 m$^2$/g and higher, preferably about 50 to 1000 m$^2$/g), high porosity (about 80% and greater, preferably greater than about 85%), and/or relatively large pore volume (more than about 1.0 mL/g, preferably about 1.2 mL/g and higher).

"Fiber," as used herein, refers to an elongated structure having an approximately uniform diameter of at least 100 nm and up to 200 μm.

"Non-fibrous organic polymer matrix," as used herein, refers to a gel matrix comprised of organic polymers that are not organized into a fiber. Such a matrix typically comprises polymer particles clustered together and arranged in such a way as to define voids, or "pores," within an aerogel.

The use of the words "a" or "an" when used in conjunction with the term "comprising" "including," "containing," or "having" in the claims and/or the specification may mean "one," but it is also consistent with the meaning of "one or more,' "at least one," and "one or more than one."

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The fiber-reinforced organic polymer aerogel of the present invention can "comprise," "consist essentially of," or "consist of" particular ingredients, components, compositions, etc., disclosed throughout the specification. With respect to the transitional phase "consisting essentially of," in one non-limiting aspect, a basic and novel characteristic of the fiber-reinforced organic polymer aerogel of the present invention is that it has at least bimodal pore size distribution with a first mode of pores having an average pore size of less than or equal to 50 nm and a second mode of pores having an average pore size of greater than 50 nm.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

Figure 1A:
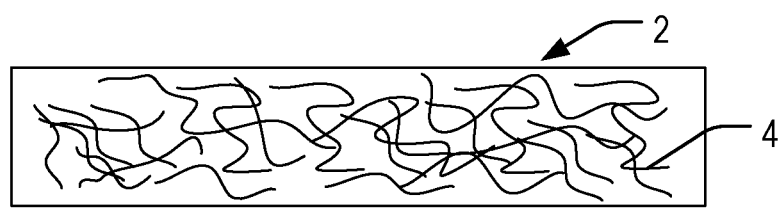
FIGS. 1A-1C are cross-sectional illustrations of some aerogel embodiments disclosed herein.

While the invention is susceptible to various modifications and alternative forms, specific embodiments thereof are shown by way of example in the drawings and may herein be described in detail. The drawings may not be to scale.

DETAILED DESCRIPTION

A discovery has been made that provides a fiber-reinforced organic polymer aerogel with superior thermal and mechanical properties as compared to unreinforced aerogels. Without wishing to be bound by theory, it is believed that the presence of the multi-modal (e.g., bimodal or trimodal) pore size distribution throughout the aerogel network contributes to the low thermal conductivity (e.g., ≤25 mW/m·K at a temperature below 150° C.) of the aerogels of the present invention. The presence of the fibers is believed to contribute to the mechanical strength of the aerogels and influence aerogel pore structures. The presence of different polymer particle sizes in the wet-gel and fiber matrix is believed to prevent network collapse during drying, which allows the aerogels of the present invention to be produced by processes such as thermal drying or evaporative air drying in lieu of, or in addition to, the more commonly used freeze-drying and super-critical drying processes.

These and other non-limiting aspects of the present invention are provided in the following subsections.

A. Fiber-Reinforced Organic Polymer Aerogels

Figure 1B:
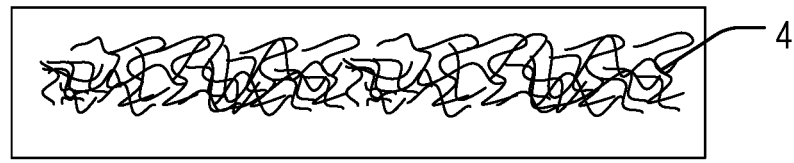
Figure 1C:
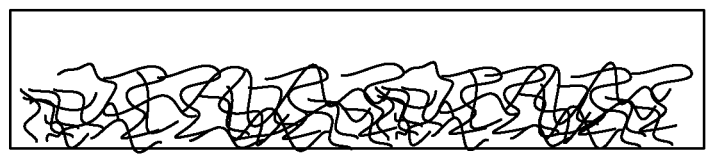

The fiber-reinforced organic polymer aerogels of the present invention include a non-fibrous organic polymer matrix and fibers comprised in the non-fibrous organic polymer matrix. FIGS. 1A, 1, and 1C provide non-limiting illustrations of aerogel 2 of the present invention, in which fiber matrix 4 is embedded. In FIG. 1A, fiber matrix 4 is distributed throughout aerogel 2; that is, the fiber matrix has the same size and volume as the aerogel itself. FIGS. 1B and 1C illustrate embodiments in which fiber matrix 4 is not distributed throughout aerogel 2, but is instead limited to a portion of the aerogel. Fiber matrix 4 can be located in various locations within aerogel 2, as illustrated by the differing locations in FIG. 1B, where fiber matrix 4 is located centrally within the aerogel, and FIG. 1C, where the fiber matrix is located in a bottom portion of the aerogel.

1. Organic Polymer Matrix

The organic polymer matrix of the present invention can be composed of a variety of organic polymers. In a preferred embodiment, the reinforced aerogel matrix is made from resorcinol formaldehyde or polyimide. The organic components can include thermoplastic or thermoset polymers, co-polymers thereof, and blends thereof that are discussed throughout the present application. The polymers can be branched, linear, or cross-linked. The fiber-reinforced polymer aerogel can include polymers or polymer precursors of polyethylene terephthalate (PET), a polycarbonate (PC) family of polymers, polybutyrate adipate terephthalate (PBAT), a biodegradable random copolymer, specifically a copolyester of adipic acid, 1,4-butanediol and dimethyl terephthalate), poly(1,4-cyclohexylidene cyclohexane-1,4-dicarboxylate) (PCCD), glycol modified polycyclohexyl terephthalate (PCTG), poly(phenylene oxide) (PPO), polyvinyl chloride (PVC), polystyrene (PS), polymethylmethacrylate (PMMA), polyacrylic acid, poly(methacrylic)acid, polyethyleneimine, polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), unsaturated polyester resins, polyurethane (PU), polyoxybenzylmethylenglycolanhydride (e.g., bakelite), urea-formaldehyde, diallyl-phthalate, epoxy resin, epoxy vinylesters, cyanate esters of polycyanurates, dicyclopentadiene, phenolics, benzoxazines, polyacrylate, polyacrylonitrile, polyurea, polyamine, polyimide, polyether, polyester, polyvinyl alcohol (PVOH), polyvinyl butyral (PVB), polyfurfural alcohol, polyphenol, phenol furfuryl alcohol, melamine formaldehyde, resorcinol formaldehyde, cresol formaldehyde, phenol formaldehyde, polyvinyl alcohol dialdehyde, polycyanurate, polyacrylamide, various epoxies, agar, agarose, co-polymers thereof, or blends thereof. For this purpose of this disclosure PVOH and PVB can be derived from vinyl acetate which is derived from acetaldehyde are not considered polyolefins. In particular embodiments, the reinforced polymer aerogels include an organic polymer matrix of a polymer selected from a polyamine, a polyamide, a polyimide, a poly(amide-imide), a poly(amic amide), a poly(ether imide), a polyphenol, a polyvinyl alcohol, a polyvinyl butyral, a polyurethane, a polyurea, a polyether, a polyester, a polyacid, a polycarbonate, or any combination thereof. The polymer can be included in a composition that includes said polymer and additives. Non-limiting examples of additives include coupling agents, antioxidants, heat stabilizers, flow modifiers, colorants, opacifiers, surfactants, etc., or any combinations thereof.

The characteristics or properties of the final polymer are significantly impacted by the choice of precursor monomers, which are used to produce the polymer. Factors to be considered when selecting monomers include the properties of the final polymer, such as the thermal conductivity, mechanical properties, flexibility, thermal stability, coefficient of thermal expansion (CTE), coefficient of hydroscopic expansion (CHE) and any other properties specifically desired, as well as cost. Often, certain important properties of a polymer for a particular use can be identified. Other properties of the polymer may be less significant, or may have a wide range of acceptable values; so many different monomer combinations could be used.

Other factors to be considered in the selection of precursor monomers (e.g., resorcinol and formaldehyde) include the expense and availability of the monomers chosen. Commercially available monomers that are produced in large quantities generally decrease the cost of producing polymer materials since such monomers are in general less expensive than monomers produced on a lab scale and pilot scale. Additionally, the use of high purity commercially available monomers can improve the overall reaction efficiency because additional reactions are not required to produce a monomer, which is then incorporated into the polymer. A potential supplier of precursor monomers includes Sigma-Aldrich, USA.

In some embodiments, the backbone of the polymer includes reactive substituents. The substituents (e.g., chain end groups, oligomers, functional groups, etc.) can be directly bonded to the backbone, linked to the backbone through a linking group (e.g., a tether or a flexible tether), or brought about by further reaction of polymer backbone. For example, partial hydrolysis of polyester or polycarbonate polymer can release functional groups that can be used in reinforcing. Any further chemical or physical modification of the polymer backbone for this purpose is contemplated herein. In preferred aspects, the polymer precursor includes a reinforceable functional group selected from amine, amide, imide, ether, phenol, alcohol, butyral, urethane, urea, carbonate, ester, ether, or acid, or any combination thereof. In other embodiments, a compound or particles can be incorporated (e.g., blended and/or encapsulated) into the polymer structure without being covalently bound. In some instances, the incorporation of the compound or particles can be performed during polymerization. In some instances, particles can aggregate, thereby producing polymers having domains with different concentrations of the non-covalently bound compounds or particles.

In some instances, the polymer precursor compositions used to prepare the fiber-reinforced polymer aerogel of the present invention can include multifunctional monomers with at least three reactive functionalities. The multifunctional monomers can be a substituted or unsubstituted aliphatic multifunctional amine, a substituted or unsubstituted aromatic multifunctional amine, or a multifunctional amine that includes a combination of an aliphatic and two aromatic groups, or a combination of an aromatic and two aliphatic groups. A non-limiting list of possible multifunctional amines include propane-1,2,3-triamine, 2-aminomethylpropane-1,3-diamine, 3-(2-aminoethyl)pentane-1,5-diamine, bis(hexamethylene)triamine, N',N'-bis(2-aminoethyl)ethane-1,2-diamine, N',N'-bis(3-aminopropyl)propane-1,3-diamine, 4-(3-aminopropyl)heptane-1,7-diamine, N',N'-bis(6-aminohexyl)hexane-1,6-diamine, benzene-1,3,5-triamine, cyclohexane-1,3,5-triamine, melamine, N-2-dimethyl-1,2,3-propanetriamine, diethylenetriamine, 1-methyl or 1-ethyl or 1-propyl or 1-benzyl-substituted diethylenetriamine, 1,2-dibenzyldiethylenetriamine, lauryldiethylenetriamine, N-(2-hydroxypropyl)diethylenetriamine, N,N-bis(1-methylheptyl)-N-2-dimethyl-1,2,3-propanetriamine, 2,4,6-tris(4-(4-aminophenoxy)phenyl)pyridine, N,N-dibutyl-N-2-dimethyl-1,2,3-propanetriamine, 4,4'-(2-(4-aminobenzyl) propane-1,3-diyl)dianiline, 4-((bis(4-aminobenzyl)amino) methyl)aniline, 4-(2-(bis(4-aminophenethyl)amino)ethyl) aniline, 4,4'-(3-(4-aminophenethyl)pentane-1,5-diyl) dianiline, 1,3,5-tris(4-aminophenoxy)benzene, 4,4',4"-methanetriyltrianiline, N,N,N',N'-tetrakis(4-aminophenyl)-1,4-phenylenediamine, a polyoxypropylenetriamine, octa (aminophenyl)polyhedral oligomeric silsesquioxane, or combinations thereof. A specific example of a polyoxypropylenetriamine is JEFFAMINE® T-403 from Huntsman Corporation, The Woodlands, TX USA. The multifunctional monomers can also include alcohols, acids, esters, anhydrides, acid chlorides, etc. Suitable multifunctional monomers include, but are not limited to, multifunctional alcohols such as 2-methyl-1,3-propanediol, 1,2-propanediol, 1,3-propanediol, glycerol, and ethylene glycol, arabitol, erythritol, glycerol, isomalt, lactitol, maltitol, mannitol, sorbitol, xylitol, sucrose, sucralose, benzene-1,3,5-triol, cyclohexane-1,2,4-triol; multifunctional acids such as 1,3,5-cyclohexanetricarboxylic acid, Kemp's triacid, 1,2,3-benzenetricarboxylic acid, 1,2,4-benzenetricarboxylic acid, 1,3,5-benzenetricarboxylic acid, 5-(4-carboxy-2-nitrophenoxy)-isophthalic acid, 1,2,3,4-butanetetracarboxylic acid, tetrahydrofuran-2,3,4,5-tetracarboxylic acid, 2,2',2'',2'''-[1,2-ethanediylidene-tetrakis(thio)]-tetrakisacetic acid, cyclobutanetetracarboxylic acid, 1,2,4,5-benzenetetracarboxylic acid, mellitic acid, 1,4,5,8-naphthalene tetracarboxylic acid, and 1,2,3,4,5,6-cyclohexanehexacarboxylic acid; multifunctional esters such as methyl, ethyl or butyl esters of the above acids and triethylmethanetricarboxylate, triethyl 1,1,2-ethanetricarboxylate, tetraethyl 1,1,2,2-ethanetetracarboxylate, tetraethyl ethylenetetracarboxylate, tetramethyl exo,exo-tetracycloundeca-3,8-diene-3,4,8,9-tetracarboxylate, and pentamethyl cyclopentadiene-1,2,3,4,5-pentacarboxylate; anhydrides such as 1,2,4-benzenetricarboxylic anhydride, 1,2,4,5-benzenetetracarboxylic dianhydride, and bicyclo[2,2,2]oct-7-ene-2,3,5,6-tetracarboxylic anhydride; and acid chlorides such as 1,3,5-benzenetricarbonyl chloride. In some embodiments, the polymer matrix is a resorcinol formaldehyde polymer.

Polymer matrices made from multifunctional monomers can be strengthened by cross-linking. Methods of cross-linking polymers are known in the art, as in, for example, U.S. Pat. No. 8,637,582 to Gawryla & Schiraldi and U.S. Pat. No. 9,434,832 to Meador. In some embodiments, the cross-linked polymer matrix comprises a cross-linked resorcinol formaldehyde polymer.

2. Fiber Reinforcement

Embodiments of the aerogels disclosed herein are internally reinforced by fibers. The fibers can be composed of a variety of materials. As non-limiting examples, the fibers can be glass fibers, polyester fibers, carbon fibers, aramid fibers, polyethylene fibers, polyamide fibers, basalt fibers, steel fibers, cellulose fibers, ceramic fibers, or a combination thereof.

The fibers can be arranged in a variety of fibrous structures. For example, the fibers can form a fiber matrix, as in felt, batting, lofty batting, a mat, a woven fabric, a nonwoven fabric. The fiber-reinforced aerogel can comprise any of these fibrous materials alone or in combination. The fibers within the aerogel can be unidirectionally or omnidirectionally oriented. In some embodiments, the fibers can have an average filament cross sectional area from 5 $\mu m^2$ to 40,000 $\mu m^2$. The fibers can have an average length of 20 mm to 100 mm.

In some embodiments, the fibers in the fiber-reinforced aerogel are distributed throughout the aerogel. In such embodiments, the cast gel has the same shape and volume as the fibrous material comprised within the gel. Such embodiments can be formed during the casting process by adding the appropriate amount of liquid gel precursor to just submerge a fibrous material. In some embodiments, a layered aerogel product can be formed in which a portion of the aerogel is free of fibers.

3. Pore Size Distribution

In embodiments disclosed herein, fiber-reinforced aerogels are characterized by their pore size distribution. Pore size distribution can be measured in a variety of ways known to those of ordinary skill in the art, including, for example, nitrogen gas adsorption and mercury intrusion porosimetry (MIP). In some embodiments, the pore size distribution is at least bimodal. In such embodiments, there are at least two distinct groups, or "modes," of pore diameters in the aerogel. For example, an aerogel with a bimodal distribution may have one population of pores with an average diameter of 50 nm or less and another population of pores with an average diameter of greater than 50 nm, with no additional distinct groups of pores. Distinct modes of pores can often be visualized in a plot showing the pore size distribution, which can be a plot of pore volume or pore number versus pore diameter. In such plots, a mode can be visualized as a peak. In a multi-modal pore size distribution, more than one distinct peak can be seen. Some embodiments may have 2, 3, 4, 5, or more distinct modes. An embodiment with at least three distinct modes of pores is described herein as having an at least trimodal pore size distribution.

The pore size distribution can be affected during the manufacturing process by the relative concentration of a basic compound, such as calcium carbonate, present in a gel precursor solution. For example, decreasing the molar ratio of base in the gel precursor solution can increase the population of pores having relatively large diameters (e.g., greater than 10 μm), leading to the creation of one or more large-diameter modes.

4. Tensile Strength

In some embodiments described herein, the fiber-reinforced organic polymer aerogels are characterized by their tensile strength, which is also known as ultimate tensile strength (UTS). This is a measure of the capacity of a material to withstand loads tending to elongate. The tensile strength of embodiments described herein are significantly greater than that of previously available fiber-reinforced aerogels. As used herein, the tensile strength is the ultimate tensile strength as measured according to American Standard Testing Method (ASTM) D5034 Standard Specification for Breaking Force and Elongation of Textile Fabrics (Grab Method). The tensile strength may vary depending on the direction in which the test is performed. For some embodiments of the aerogels described herein, the tensile strength is greater when measured in the machine direction than when measured in the cross direction.

B. Synthesis of Fiber-Reinforced Organic Polymer Aerogels

Figure 2:
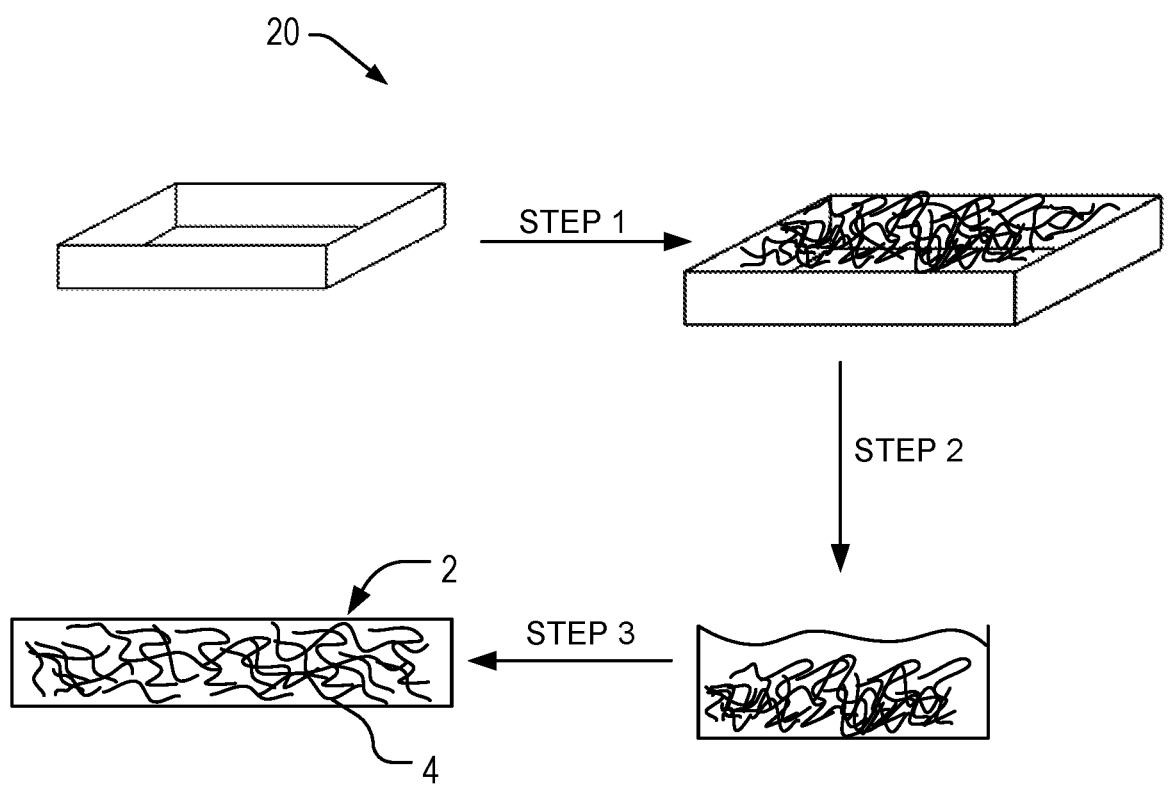
FIG. 2 is an illustration of a process of making a fiber-reinforced organic polymer aerogel.

Aerogels of the present disclosure can be made using a multi-step process that includes 1) preparation of the fiber-reinforced organic polymer gel, 2) solvent exchange and 3) drying of the fiber-reinforced gel to form the aerogel. FIG. 2 illustrates an exemplary method of making fiber-reinforced organic polymer aerogel 2. In step 1, fibrous material 4 can be placed inside a casting container 10. In step 2, gel precursor solution 11 including organic polymer precursors and optional catalyst can be prepared and poured into the casting container 10, submerging fibrous material 4. In step 3, submerged fibrous material 4 can be gelled and dried to produce fiber-reinforced organic polymer aerogel 2. These process steps are discussed in more detail below.

1. Preparation of the Fiber-Reinforced Organic Polymer Gel

The first stage in the synthesis of a fiber-reinforced organic polymer aerogel is the synthesis of a fiber-reinforced organic polymer wet gel. To create the wet gel, a gel precursor solution is combined with fibers, followed by gelation. This can be accomplished by, for example, pouring the solution over fibers that have been placed in a casting container or on a casting sheet, causing the fibers to become immersed in the solution. Additionally or alternatively, fibers can be stirred into or otherwise combined with the gel precursor solution before or after casting. Gelation causes the creation of a fiber-reinforced wet gel.

Generally, organic polymer gels are prepared from organic monomers by polymerization, such as step-growth polymerization, chain-growth polymerization, or photopolymerization. For example, if a polyamide aerogel is desired, at least one diacid monomer can be reacted with at least one diamino monomer in a reaction solvent by condensation in a step-growth polymerization to form a polyamide. As discussed above, a number of other polymers, co-polymers thereof, or blends thereof can be used in the fiber-reinforced polymer aerogels disclosed herein. In some instances, the polymer matrix comprises a polyimide matrix. If a polyimide aerogel is desired, at least one acid monomer can be reacted with at least one diamino monomer in a reaction solvent to form a poly(amic acid). Numerous acid monomers and diamino monomers may be used to synthesize the poly(amic acid). In one aspect, the poly(amic acid) is contacted with an imidization catalyst in the presence of a chemical dehydrating agent to form a polymerized polyimide gel via an imidization reaction. Any imidization catalyst suitable for driving the conversion of polyimide precursor to the polyimide state is suitable. Preferred chemical imidization catalysts comprise at least one compound selected from the group consisting of pyridine, methylpyridines, quinoline, isoquinoline, 1,8-diazabicyclo[5.4.0]undec-7-ene (DBU), triethylenediamine, lutidine, N-methylmorpholine, triethylamine, tripropylamine, tributylamine, imidazole or a substituted imidazole, a triazole or a substituted triazole, a tetrazole or substituted tetrazole, a purine or a substituted purine, a pyrazole or a substituted pyrazole, other trialkylamines, or combinations thereof. Any dehydrating agent suitable for use in formation of an imide ring from an amic acid precursor is suitable. Preferred dehydrating agents comprise at least one compound selected from the group consisting of acetic anhydride, propionic anhydride, n-butyric anhydride, benzoic anhydride, trifluoroacetic anhydride, oxalyl chloride, thionyl chloride, phosphorus trichloride, dicyclohexylcarbodiimide, 1,1'-carbonyldiimidazole (CDI), di-tert-butyl dicarbonate ($Boc_2O$), or combinations thereof.

In some embodiments, the polymer matrix comprises a resorcinol formaldehyde polymer. To prepare a gel comprising this polymer, resorcinol and formaldehyde can be combined together in aqueous solution in the presence of a metal salt catalyst. The resorcinol and formaldehyde can combine to form the resorcinol formaldehyde polymer particles, which form the gel matrix. The resorcinol to formaldehyde (R/F) ratio can be any desired ratio to form the desired resorcinol formaldehyde polymer. By way of example, the R/F ratio can be 5:1 to 0.25:1, or greater than, equal to, or between any two of 5:1, 4:1, 3:1, 2:1, 1:1, 0.5:1, and 0.25:1. In one instance, the R/F ratio is 0.6:1 to 0.4:1, or about 0.5:1. Non-limiting examples of metal salts can include lithium carbonate ($Li_2CO_3$), sodium carbonate ($Na_2CO_3$), potassium carbonate ($K_2CO_3$), rubidium carbonate ($Rb_2CO_3$), cesium carbonate ($Cs_2CO_3$), magnesium carbonate ($MgCO_3$), calcium carbonate ($CaCO_3$), strontium carbonate ($SrCO_3$), barium carbonate ($BaCO_3$), or combinations thereof. In some embodiments, the catalyst can include calcium and sodium in a weight ratio of 5:1 to 1:1, or equal to, or between any two of 5:1, 4:1, 3:1, 2:1, and 1:1. A molar ratio of resorcinol to catalyst (R/C) ratio can be greater than, equal to, or between any two of 1:1, 10:1, 20:1, 30:1, 40:1, 50:1, 100:1, 200:1, 300:1, 400:1, 500:1, 600:1, 700:1, 800:1, 900:1, 1000:1, 1500:1, and 2000:1. The total solids content in the gel precursors (i.e., resorcinol, formaldehyde, and catalyst) can be at least, equal two or between any two of 15% w/v, 20% w/v, 25% w/v, 30% w/v, 35% w/v, 40% w/v and 50% w/v.

The reaction solvent for polymerization, cross-linking, or both can be amide solvents such as but not limited to formamide, N-methylformamide, N,N-dimethylformamide, N,N-diethylformamide, N,N-dimethylacetamide, N,N-diethylacetamide, 2-pyrrolidone, N-methyl-2-pyrrolidone, 1-methyl-2-pyrrolidinone, N-cyclohexyl-2-pyrrolidone, N-vinylacetamide, N-vinylpyrrolidone, hexamethylphosphoramide, and 1,13-dimethyl-2-imidazolidinone; organosulfur solvents such as but not limited to dimethylsulfoxide, diethylsulfoxide, diethyl sulfoxide, methylsulfonylmethane, and sulfolane; ether solvents including but not limited to cyclopentyl methyl ether, di-tert-butyl ether, diethyl ether, diethylene glycol diethyl ether, diglyme, diisopropyl ether, dimethoxyethane, dimethoxymethane, 1,4-dioxane, ethyl tert-butyl ether, glycol ethers, methoxyethane, 2-(2-methoxyethoxy)ethanol, methyl tert-butyl ether, 2-methyltetrahydrofuran, morpholine, tetraglyme, tetrahydrofuran, tetrahydropyran, and triglyme; hydrocarbon solvents including but not limited to benzene, cycloheptane, cyclohexane, cyclohexene, cyclooctane, cyclopentane, decalin, dodecane, durene, heptane, hexane, limonene, mesitylene, methylcyclohexane, naphtha, octadecene, pentamethylbenzene, pentane, pentanes, petroleum benzene, petroleum ether, toluene tridecane, turpentine, and xylene; nitro solvents including but not limited to nitrobenzene, nitroethane, and nitromethane; alcohol solvents including but not limited to methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, tert-amyl alcohol, phenols, cresols, xylenols, catechol, benzyl alcohol, 1,4-butanediol, 1,2,4-butanetriol, butanol, 2-butanol, N-butanol, tert-butyl alcohol, diethylene glycol, ethylene glycol, 2-ethylhexanol, furfuryl alcohol, glycerol, 2-(2-methoxyethoxy)ethanol, 2-methyl-1-butanol, 2-methyl-1-pentanol, 3-methyl-2-butanol, neopentyl alcohol, 2-pentanol, 1,3-propanediol, and propylene glycolcycol; ketone solvents including but not limited to hexanone, acetone, methyl ethyl ketone, methyl isobutyl ketone, disobutyl ketone, acetophenone, butanone, cyclopentanone, ethyl isopropyl ketone, 2-hexanone, isophorone, mesityl oxide, methyl isopropyl ketone, 3-methyl-2-pentanone, 2-pentanone, and 3-pentanoneacetyl acetone; halogenated solvents including but not limited to benzotrichloride, bromoform, bromomethane, carbon tetrachloride, chlorobenzene, 1,2-dichlorobenzene, 1,3-dichlorobenzene, 1,4-dichlorobenzene, chlorofluorocarbon, chloroform, chloromethane, 1,1-dichloro-1-fluoroethane, 1,1-dichloroethane, 1,2-dichloroethane, 1,1-dichloroethene, 1,2-dichloroethene, dichloromethane, diiodomethane, FC-75, haloalkane, halomethane, hexachlorobutadiene, hexafluoro-2-propanol, parachlorobenzotrifluoride, perfluoro-1,3-dimethylcyclohexane, perfluorocyclohexane, perfluorodecalin, perfluorohexane, perfluoromethylcyclohexane, perfluoromethyldecalin, perfluorooctane, perfluorotoluene, perfluorotripentylamine, tetrabromomethane, 1,1,1,2-tetrachloroethane, 1,1,2,2-tetrachloroethane, tetrachloroethylene, 1,1,1-tribromoethane, 1,3,5-trichlorobenzene, 1,1,1-trichloroethane, 1,1,2-trichloroethane, trichloroethylene, 1,2,3-trichloropropane, 2,2,2-trifluoroethanol, and trihalomethane; ester solvents including but not limited to methyl acetate, ethyl acetate, butyl acetate, 2-methoxyethyl acetate, benzyl benzoate, bis(2-ethylhexyl) adipate, bis(2-ethylhexyl) phthalate, 2-butoxyethanol acetate, sec-butyl acetate, tert-butyl acetate, diethyl carbonate, dioctyl terephthalate, ethyl acetate, ethyl acetoacetate, ethyl butyrate, ethyl lactate, ethylene carbonate, hexyl acetate, isoamyl acetate, isobutyl acetate, isopropyl acetate, methyl acetate, methyl lactate, methyl phenylacetate, methyl propionate, propyl acetate, propylene carbonate, and triacetin; water, or mixtures thereof. The reaction solvent and other reactants can be selected based on the compatibility with the materials and methods applied i.e., if the polymerized gel is to be cast onto a support film, injected into a moldable part, or poured into a shape for further processing into a work piece. The reaction solvent and other reactants will be selected based on the compatibility with the fiber material.

In some aspects, an agent (e.g., curing agents, dehydration agents, radical initiators (photo or thermal) or the like) suitable for driving the conversion of the reactants (i.e., polymer precursor, polymers) to the polymer matrix can be employed. The conversion may also be driven by heat or irradiation with electromagnetic radiation (e.g., infrared or UV radiation). Curing agents can be selected based on the types of polymers formed. Non-limiting examples of such compounds include pyridine, methylpyridines, quinoline, isoquinoline, 1,8-diazabicyclo[5.4.0]undec-7-ene (DBU), DBU phenol salts, carboxylic acid salts of DBU, triethylenediamine, carboxylic acid slats of triethylenediamine, lutidine, N-methylmorpholine, triethylamine, tripropylamine, tributylamine, other trialkylamines, imidazole, 2-methyl imidazole, 2-ethyl-4-methylimidazole, or combinations thereof. Dehydrating agents may include acetic anhydride, propionic anhydride, n-butyric anhydride, benzoic anhydride, trifluoroacetic anhydride, oxalyl chloride, thionyl chloride, phosphorus trichloride, dicyclohexylcarbodiimide, 1,1'-carbonyldiimidazole (CDI), di-tert-butyl dicarbonate ($Boc_2O$), or combinations thereof. Radical initiators include azobisisobutyronitrile (AIBN), benzoyl peroxide, 2,2-dimethoxy-2-phenylacetophenone (DMPA) and the like, or combination thereof.

Reaction conditions to effect polymerization can vary depending on the type of polymer precursors used. Reaction conditions can include temperature and pressure. Temperatures can range from at least, equal to, or between any two of 50° C., 75° C., 100° C., 125° C., 150° C., 175° C. and 200° C. at atmospheric pressure (about 0.101 MPa), or between 80° C. and 100° C. The gel precursor solution can be cast or poured over the fiber source, and held until a gel forms (e.g., 1 minute to 30 days). In some embodiments, the gel precursor solution can be held for 1 to 3 days to produce a fiber-reinforced resorcinol formaldehyde polymeric matrix.

2. Solvent Exchange

After the reinforced organic polymer wet gel is synthesized, it can be desirable to conduct a solvent exchange wherein the reaction solvent used in the gel precursor is exchanged for a second solvent more suitable for the drying step. Accordingly, in one embodiment, a solvent exchange can be conducted wherein the wet gel is placed inside of a vessel and submerged in a mixture comprising the reaction solvent and the second solvent. Then, a high-pressure atmosphere is created inside of the vessel thereby forcing the second solvent into the reinforced polymerized gel and displacing a portion of the reaction solvent. Alternatively, the solvent exchange step may be conducted without the use of a high-pressure environment. It may be necessary to conduct a plurality of rounds of solvent exchange. The time necessary to conduct the solvent exchange will vary depending upon the type of polymer undergoing the exchange as well as the reaction solvent and second solvent being used. In one embodiment, each solvent exchange lasts approximately twenty-four hours. In another embodiment, each solvent exchange lasts approximately 30 minutes.

Exemplary second solvents include amide solvents such as but not limited to formamide, N-methylformamide, N,N-dimethylformamide, N,N-diethylformamide, N,N-dimethylacetamide, N,N-diethylacetamide, 2-pyrrolidone, N-methyl-2-pyrrolidone, 1-methyl-2-pyrrolidinone, N-cyclohexyl-2-pyrrolidone, N-vinylacetamide, N-vinylpyrrolidone, hexamethylphosphoramide, and 1,13-dimethyl-2-imidazolidinone; organosulfur solvents (e.g., dimethylsulfoxide, diethylsulfoxide, diethyl sulfoxide, methylsulfonylmethane, and sulfolane); ether solvents (e.g., cyclopentyl methyl ether, di-tert-butyl ether, diethyl ether, diethylene glycol diethyl ether, diglyme, diisopropyl ether, dimethoxyethane, dimethoxymethane, 1,4-dioxane, ethyl tert-butyl ether, glycol ethers, methoxyethane, 2-(2-methoxyethoxy)ethanol, methyl tert-butyl ether, 2-methyltetrahydrofuran, morpholine, tetraglyme, tetrahydrofuran, tetrahydropyran, and triglyme); hydrocarbon solvents (e.g., benzene, cycloheptane, cyclohexane, cyclohexene, cyclooctane, cyclopentane, decalin, dodecane, durene, heptane, hexane, limonene, mesitylene, methylcyclohexane, naphtha, octadecene, pentamethylbenzene, pentane, pentanes, petroleum benzene, petroleum ether, toluene tridecane, turpentine, and xylene); nitro solvents (e.g., nitrobenzene, nitroethane, and nitromethane); alcohol solvents (e.g., methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, tert-amyl alcohol, phenols, cresols, xylenols, catechol, benzyl alcohol, 1,4-butanediol, 1,2,4-butanetriol, butanol, 2-butanol, N-butanol, tert-butyl alcohol, diethylene glycol, ethylene glycol, 2-ethylhexanol, furfuryl alcohol, glycerol, 2-(2-methoxyethoxy)ethanol, 2-methyl-1-butanol, 2-methyl-1-pentanol, 3-methyl-2-butanol, neopentyl alcohol, 2-pentanol, 1,3-propanediol, and propylene glycolcycol); ketone solvents (e.g., hexanone, acetone, methyl ethyl ketone, methyl isobutyl ketone, disobutyl ketone, acetophenone, butanone, cyclopentanone, ethyl isopropyl ketone, 2-hexanone, isophorone, mesityl oxide, methyl isopropyl ketone, 3-methyl-2-pentanone, 2-pentanone, and 3-pentanoneacetyl acetone); halogenated solvents (e.g., benzotrichloride, bromoform, bromomethane, carbon tetrachloride, chlorobenzene, 1,2-dichlorobenzene, 1,3-dichlorobenzene, 1,4-dichlorobenzene, chlorofluorocarbon, chloroform, chloromethane, 1,1-dichloro-1-fluoroethane, 1,1-dichloroethane, 1,2-dichloroethane, 1,1-dichloroethene, 1,2-dichloroethene, dichloromethane, diiodomethane, FC-75, haloalkane, halomethane, hexachlorobutadiene, hexafluoro-2-propanol, parachlorobenzotrifluoride, perfluoro-1,3-dimethylcyclohexane, perfluorocyclohexane, perfluorodecalin, perfluorohexane, perfluoromethylcyclohexane, perfluoromethyldecalin, perfluorooctane, perfluorotoluene, perfluorotripentylamine, tetrabromomethane, 1,1,1,2-tetrachloroethane, 1,1,2,2-tetrachloroethane, tetrachloroethylene, 1,1,1-tribromoethane, 1,3,5-trichlorobenzene, 1,1,1-trichloroethane, 1,1,2-trichloroethane, trichloroethylene, 1,2,3-trichloropropane, 2,2,2-trifluoroethanol, and trihalomethane); ester solvents (e.g., methyl acetate, ethyl acetate, butyl acetate, 2-methoxyethyl acetate, benzyl benzoate, bis(2-ethylhexyl) adipate, bis(2-ethylhexyl) phthalate, 2-butoxyethanol acetate, sec-butyl acetate, tert-butyl acetate, diethyl carbonate, dioctyl terephthalate, ethyl acetate, ethyl acetoacetate, ethyl butyrate, ethyl lactate, ethylene carbonate, hexyl acetate, isoamyl acetate, isobutyl acetate, isopropyl acetate, methyl acetate, methyl lactate, methyl phenylacetate, methyl propionate, propyl acetate, propylene carbonate, and triacetin); water, and mixtures thereof. Each second solvent has a freezing point. For example tert-butyl alcohol has a freezing point of 25.5 degrees Celsius and water has a freezing point of 0 degrees Celsius under one atmosphere of pressure. Preferably, at least one solvent exchange is performed with acetone.

The temperature and pressure used in the solvent exchange process may be varied. The duration of the solvent exchange process can be adjusted by performing the solvent exchange at a varying temperatures or atmospheric pressures, or both, provided that the pressure and temperature inside the pressure vessel does not cause either the first solvent or the second solvent to leave the liquid phase and become gaseous phase, vapor phase, solid phase, or supercritical fluid. Generally, higher pressures and/or temperatures decrease the amount of time required to perform the solvent exchange, and lower temperatures and/or pressures increase the amount of time required to perform the solvent exchange.

3. Cooling and Drying

After the reinforced polymer gel has gone under solvent exchange, it is desirable to conduct a drying step wherein the solvent within the gel is removed. The drying step can be supercritical drying, subcritical drying, thermal drying, evaporative air-drying, or any combination thereof. In one embodiment, the fiber-reinforced aerogel derived from a polymeric gel can be dried under ambient conditions, for example by removing the solvent under a stream of air or anhydrous gas. In this instance the solvent in the gel is removed by evaporation and pore collapse is prevented by the reinforced matrix and the aerogel network. The drying may also be assisted by heating or irradiating with electromagnetic radiation.

In another embodiment after solvent exchange, the polymerized reinforced gel is exposed to subcritical drying. In this instance the gel is cooled below the freezing point of the second solvent and subjected to a freeze-drying or lyophilization process to produce the aerogel. For example, if the second solvent is water, then the polymerized gel is cooled to below 0° C. After cooling, the polymerized gel is subjected to a vacuum for a period of time wherein the second solvent is allowed to sublime.

In still another embodiment after solvent exchange, the polymerized reinforced gel is exposed to subcritical drying with optional heating after the majority of the second solvent has been removed through sublimation. In this instance the partially dried gel material is heated to a temperature near or above the boiling point of the second solvent for a period of time. The period of time can range from a few hours to several days, although a typical period of time is approximately 4 hours. During the sublimation process, a portion of the second solvent present in the polymerized gel has been removed, leaving the aerogel. After solvent exchange, the gel can be dried at 80 to 100° C., or about 85° C. under vacuum until dry (e.g., 0.5-3 days).

The final fiber-reinforced polymer aerogels can be any width or length. The fiber-reinforced aerogel can be in the form of defined geometry (e.g., a square or circular patch) or in the form of a sheet or roll. In some instances, the internally reinforced aerogels can have a width up to 6 meters and a length of up to 10 meters, or from 0.01 to 6 meters, 0.5 to 5 meters, 1 to 4 meters, or any range in between, and a length of 1 to 10,000 meters, 5 to 1,000 meters, 10 to 100 meters or any range there between. The width of the composite can be 0.01, 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0, 1.5, 2.0, 2.5, 3.0, 3.5, 4.0, 4.5, 5.0, 5.5, 6.0 feet or meters, including any value there between. The length of the internally reinforced aerogels can be 1, 10, 100, 500, 1000, 1500, 2000, 2500, 3000, 3500, 4000, 4500, 5000, 5500, 6000, 6500, 7000, 7500, 8000, 8500, 9000, 9500, 10000 meters or feet and include any value there between. In certain aspects, the length of the reinforced aerogel can be 1000 feet or meters, and 60 inches or 1.5 meters, respectively, in width. In a further embodiment the internally reinforced aerogel is 100 feet in length and 40 inches wide.

C. Articles of Manufacture

The fiber-reinforced organic polymer aerogels of the present invention can be included in an article of manufacture. For example, an article of manufacture can include a fiber-reinforced organic polymer matrix of a polymer selected from a polyamine, a polyamide, a polyimide, a poly(amide-imide), a poly(amic amide), a poly(ether imide), a polyphenol, a polyvinyl alcohol, a polyvinyl butyral, a polyurethane, a polyurea, a polyether, a polyester, a polyacid, a polycarbonate, resorcinol formaldehyde, or any combination thereof. In some embodiments, the article of manufacture is a thin film, monolith, wafer, blanket, core composite material, substrate for radiofrequency antenna, a sunscreen, a sunshield, a radome, insulating material for oil and/or gas pipeline, insulating material for liquefied natural gas pipeline, insulating material for cryogenic fluid transfer pipeline, insulating material for apparel, insulating material for aerospace applications, insulating material for buildings, cars, and other human habitats, insulating material for automotive applications, insulation for radiators, insulation for ducting and ventilation, insulation for air conditioning, insulation for heating and refrigeration and mobile air conditioning units, insulation for coolers, insulation for packaging, insulation for consumer goods, vibration dampening, wire and cable insulation, insulation for medical devices, support for catalysts, support for drugs, pharmaceuticals, and/or drug delivery systems, aqueous filtration apparatus, oil-based filtration apparatus, and solvent-based filtration apparatus.

In some embodiments, the fiber-reinforced organic polymer aerogel is in the form of a blanket aerogel. Blanket aerogels are flexible, conformable aerogels that can be used to cover surfaces, including those having a complex geometry. Aerogel blankets made from fiber-reinforced aerogels described herein can be used in a variety of ways, including as insulation for piping or for other structures having irregular surfaces.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

(Single Layer Polyester Fiber-Reinforced Resorcinol Formaldehyde Aerogels)

Fiber-reinforced resorcinol formaldehyde aerogels were produced in which the molar ratio of resorcinol to catalyst (R/C) in the gel precursor was 100, 200, 300, 400, or 500. The catalyst was calcium carbonate. The total solids content in the gel precursors (i.e., resorcinol, formaldehyde, and carbonate) was kept constant at 30% w/v. The molar ratio of resorcinol to formaldehyde (R/F) was fixed at 0.5.

For a chosen R/C ratio, the required resorcinol was placed in a sealable reactor with 50 mL of deionized water and mechanically stirred until completely dissolved. The calcium carbonate was added to the resorcinol solution with continued stirring until completely dissolved. The required volume of 37 wt. % formaldehyde solution and additional deionized water to give the total volume of 600 mL at 30% solids was added to the reactor, which was sealed and stirred for 30 min. This gel precursor solution was then poured over a 0.5 cm thick polyester fiber mat laid in a casting container until the fiber mat was submerged. The polyester mat, trade name AB10, procured from Cytec Process Materials in Heanor, Derbyshire, UK is comprised of needle-punched polyester fibers, average fiber length of 64 mm and average fiber diameter of 180 μm. The cast gel precursor was held at about 85° C. for three days to gel. After three days, the fiber-reinforced wet gel was removed from the casting container and submerged in acetone for 3 days at room temperature, with acetone exchanges every 12 hours. After solvent exchange, the gel was dried by 85° C. for 2 days under vacuum.

The specific surface area, pore volume, and average pore diameter ("pore size" in Table 1) of the resulting fiber-reinforced aerogel blankets were measured by gas adsorption, and the pore volume, density, and porosity were measured by mercury intrusion porosimetry (MIP). The thermal conductivity was measured at a mean temperature of 20° C. and 13.8 kPa pressure with a heat flow meter (HFM). Table 1 lists the properties of polyester fiber-reinforced resorcinol formaldehyde aerogel blankets with the indicated R/C value and a solids content of 30% w/v.

TABLE 1

| | | MIP | | Gas absorption | | | HFM Thermal conductivity (mW/m · K) |
|---|---|---|---|---|---|---|---|
| R/C | Porosity (%) | Pore volume (cm³/g) | Density (g/cm³) | Pore volume (cm³/g) | Pore size (nm) | Specific surface area (m²/g) | |
| 100 | 45.4 | 1.38 | 0.328 | 1.14 | 22.4 | 280.9 | 28.5 |
| 200 | 53.2 | 1.60 | 0.333 | 0.69 | 16.8 | 244.6 | 26.5 |
| 300 | 61.8 | 2.78 | 0.222 | 0.54 | 17.0 | 186.0 | 24.3 |
| 400 | 76.3 | 3.24 | 0.235 | 0.34 | 14.6 | 115.8 | 23.5 |
| 500 | 65.9 | 3.28 | 0.201 | 0.27 | 11.9 | 133.1 | 24.2 |

Figure 3:
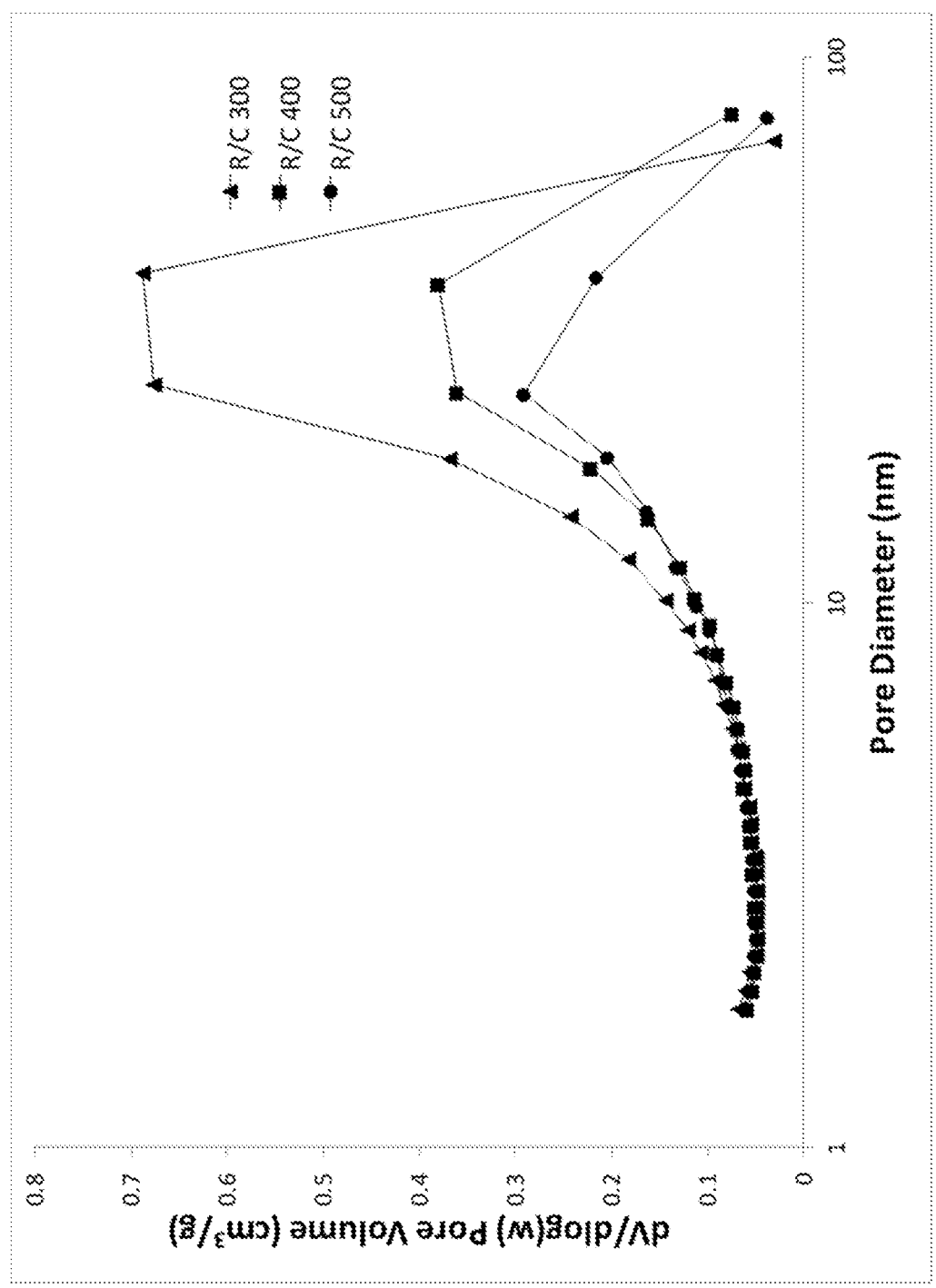
FIG. 3 shows a portion of the pore size distribution as measured by gas adsorption for fiber-reinforced resorcinol formaldehyde aerogels with resorcinol to catalyst ratio (R/C) values of 300, 400, or 500.
Figure 4:
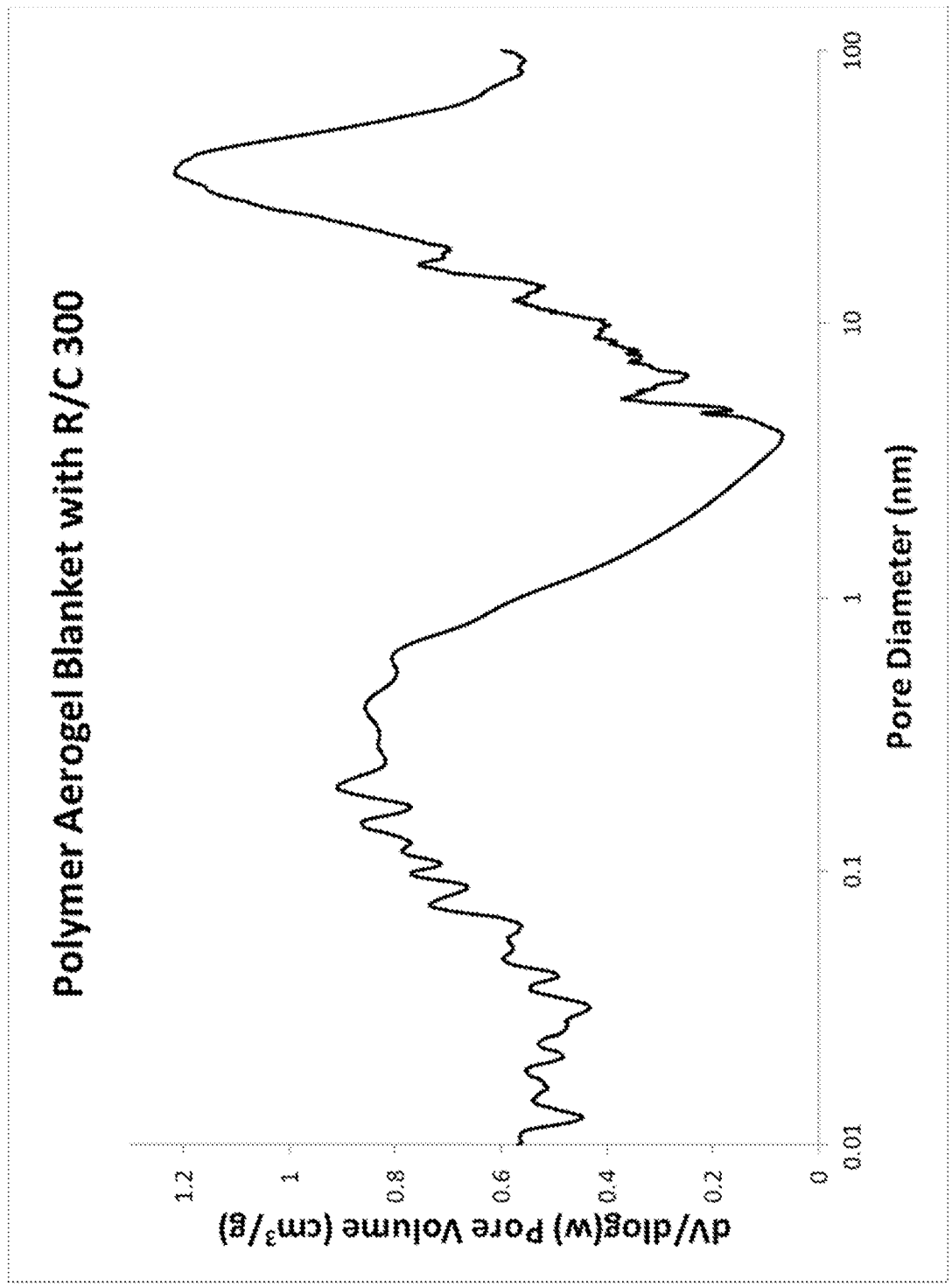
FIG. 4 shows a portion of the pore size distribution as measured by mercury intrusion porosimetry for a fiber-reinforced resorcinol formaldehyde aerogel with an R/C value of 300.
Figure 5:
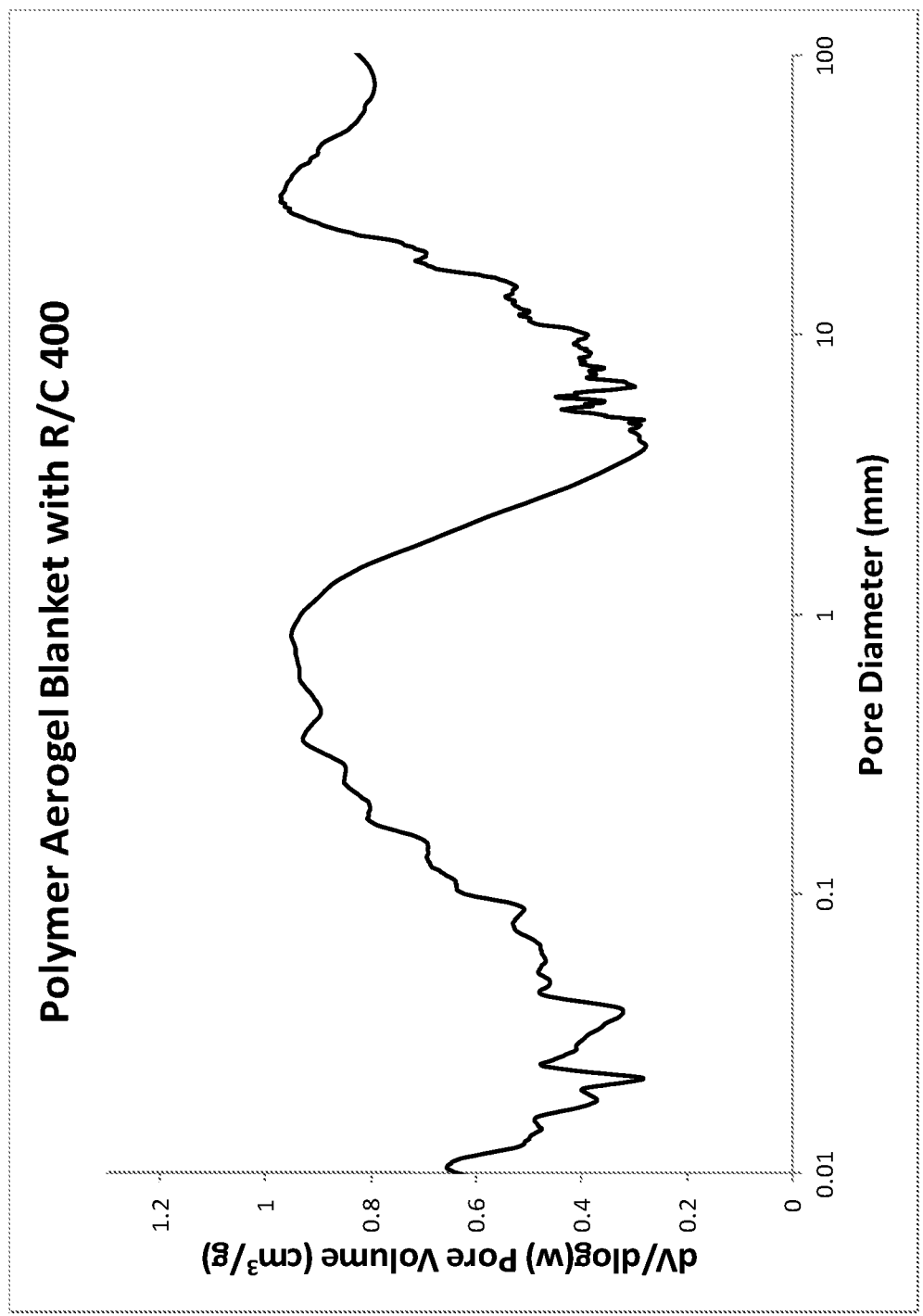
FIG. 5 shows a portion of the pore size distribution as measured by mercury intrusion porosimetry for a fiber-reinforced resorcinol formaldehyde aerogel with an R/C value of 400.
Figure 6:
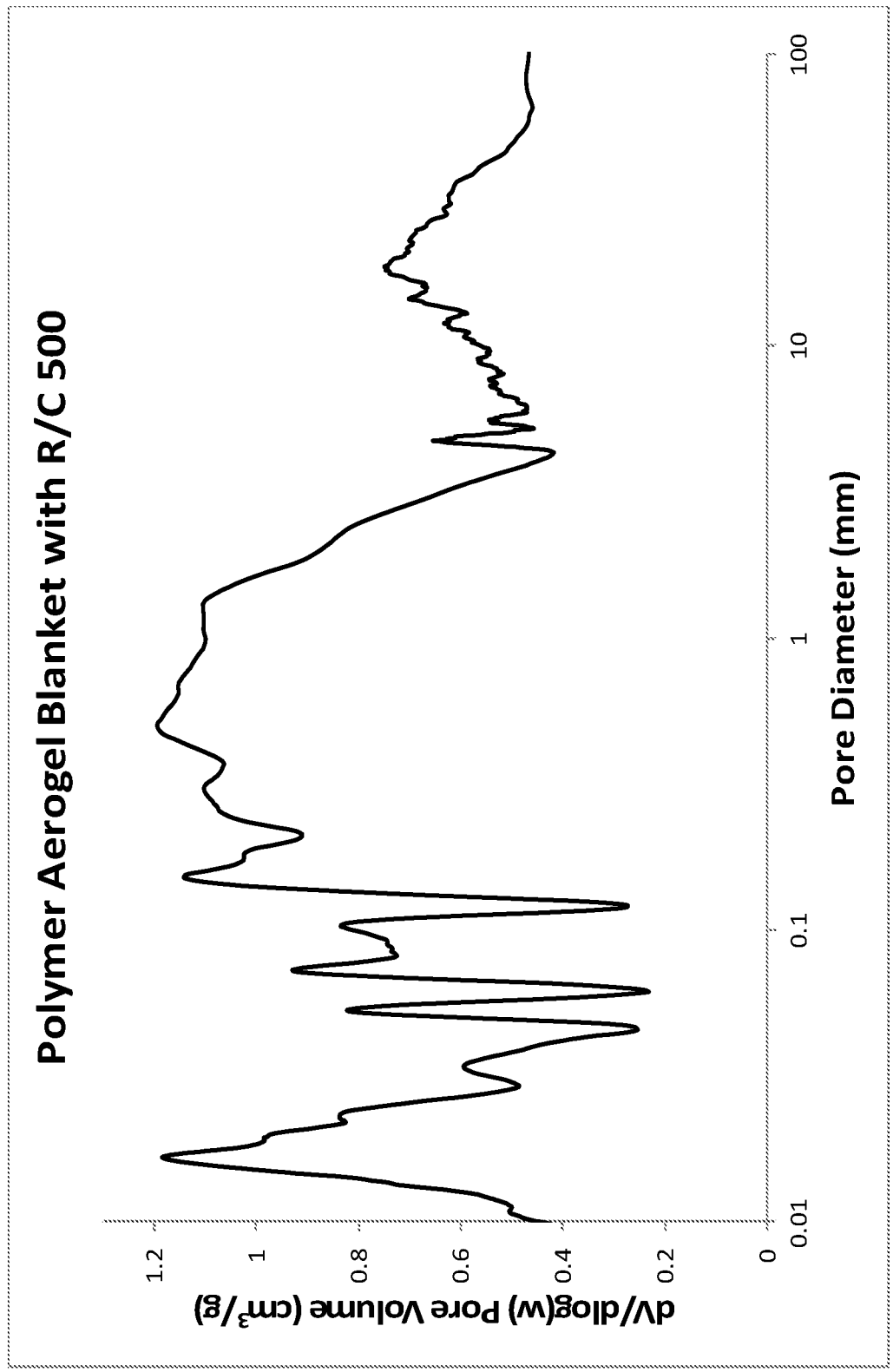
FIG. 6 shows a portion of the pore size distribution as measured by mercury intrusion porosimetry for a fiber-reinforced resorcinol formaldehyde aerogel with an R/C value of 500.

The pore size distribution of the R/C 300, 400, and 500 samples as measured by gas adsorption is set forth in FIG. 3. The pore size distribution of the R/C 300, 400, and 500 samples as measured by mercury intrusion porosimetry (MIP) are presented in FIG. 4, FIG. 5, and FIG. 6. MIP is able to measure pore diameters larger than 100 nm. FIGS. 4-6 show multi-modal pore size distributions, with substantial populations of pores larger than 100 nm.

Example 2

(Multi-Layer Polyester Fiber-Reinforced Resorcinol Formaldehyde Aerogels)

Fiber-reinforced resorcinol formaldehyde aerogels were produced in which the molar ratio of resorcinol to catalyst ratio (R/C) in the gel precursor was 300, 400, or 500. The catalyst was calcium carbonate. The total solids content in the gel precursors (i.e., resorcinol, formaldehyde, and carbonate) was 20-30% w/v. The molar ratio of resorcinol to formaldehyde (R/F) was fixed at 0.5.

For a chosen R/C ratio, the required resorcinol was placed in a sealable reactor with 50 mL of deionized water and mechanically stirred until completely dissolved. The calcium carbonate was added to the resorcinol solution with continued stirring until completely dissolved. The required volume of 37 wt. % formaldehyde solution and additional deionized water to give the total volume of 600 mL at 20-30% solids depending on the formulation, was added to the reactor, which was sealed and stirred for 30 min. This gel precursor solution was then poured over a 1 cm or 1.5 cm thick polyester fiber mat laid in a casting container until the fiber mat was submerged. The mat consists of multi-layers of single layer mat described in Example 1 and can be built to specified thickness. The layers can be bonded by the gel or needle-punched prior to incorporation of the gel to enhance bonding. The cast gel precursor was held at about 85° C. for three days to gel. After three days, the fiber-reinforced wet gel was removed from the casting container and submerged in acetone for 3 days at room temperature, with acetone exchanges every 12 hours. After solvent exchange, the gel was dried by 85° C. for 2 days under vacuum.

The thermal conductivity was measured at a mean temperature of 20° C. and 13.8 kPa with a heat flow meter (HFM). Table 2 lists the properties of multi-layer polyester fiber-reinforced resorcinol formaldehyde aerogel blankets, with the indicated R/C value.

TABLE 2

| No. of Layers | Thickness (mm) | Solid content (%) | HFM Thermal conductivity (mW/m · K) |
|---|---|---|---|
| 2 | 10 | 20 | 28.5 |
| 2 | 10 | 30 | 26.6 |
| 3 | 15 | 35 | 27.9 |
| 3 | 15 | 30 | 25.8 |

Example 3

(Polyester Fiber-Reinforced Resorcinol Formaldehyde Aerogel Blankets of the Present Invention)

Fiber-reinforced resorcinol formaldehyde aerogels were produced in which the molar ratio of resorcinol to catalyst (R/C) in the gel precursor was 400. The catalyst was calcium carbonate. The total solids content in the gel precursors (i.e., resorcinol, formaldehyde, and carbonate) was 30% w/v. The molar ratio of resorcinol to formaldehyde (R/F) was fixed at 0.5.

The required resorcinol was placed in a sealable reactor with 50 mL of deionized water and mechanically stirred until completely dissolved. The calcium carbonate was added to the resorcinol solution with continued stirring until completely dissolved. The required volume of 37 wt. % formaldehyde solution and additional deionized water to give the total volume of 600 mL at 30% solids was added to the reactor, which was sealed and stirred for 30 min. This gel precursor solution was then poured over a 1 cm thick polyester fiber mat laid in a casting container until the fiber mat was submerged. A mat was procured from Nonwoven Innovation & Research Institute in Leeds, UK and was comprised of needle-punched polyester fiber, average fiber length of 28 mm and average fiber diameter of 17 μm. The cast gel precursor was held at about 85° C. for three days to gel. After this period, the fiber-reinforced wet gel was removed from the casting container and submerged in acetone for 3 days at room temperature, with acetone exchanges every 12 hours. After solvent exchange, the gel was dried by 85° C. for 2 days under vacuum.

The thermal conductivity was measured at a mean temperature of 20° C. and 13.8 kPa by heat flow meter (HFM). The ultimate tensile strength (UTS) and modulus were measured at 23° C. in the machine direction ("machine" in Table 3) and the cross direction ("cross" in Table 3) according to American Standard Testing Method (ASTM) ASTM D5034 Standard Specification for Breaking Force and Elongation of Textile Fabrics (Grab Method). The properties of polyester fiber reinforced resorcinol formaldehyde aerogel blankets of the present invention are set forth in Table 3. For comparison, Table 3 also includes the tensile testing values measured for a commercially available fiber-reinforced silica aerogel blanket sold under the trade name Spaceloft® by Aspen Aerogel. As can be seen from Table 3, the tensile properties of the polyester fiber-reinforced resorcinol formaldehyde aerogel of the present invention produced according to this Example 3 are many fold higher than those of the commercially available aerogel blanket.

TABLE 3

|  | Thermal Cond. (mW/m · K) | Machine UTS (MPa) | Machine Modulus (MPa) | Cross UTS (MPa) | Cross Modulus (MPa) |
| --- | --- | --- | --- | --- | --- |
| Example 3 | 26 | 4.9 | 57.9 | 2.1 | 41.8 |
| Comparative Aerogel Blanket | 16 | 0.4 | 15.6 | 0.1 | 6.1 |

Example 4

(Glass Fiber-Reinforced Resorcinol Formaldehyde Aerogels)

Fiber-reinforced resorcinol formaldehyde aerogels were produced in which the molar ratio of resorcinol to catalyst (R/C) in the gel precursor was 100 or 400. The catalyst was calcium carbonate. The total solids content in the gel precursors (i.e., resorcinol, formaldehyde, and carbonate) was kept constant 30% w/v. The molar ratio of resorcinol to formaldehyde (R/F) was fixed at 0.5.

For a chosen R/C ratio, the required resorcinol was placed in a sealable reactor with 50 mL of deionized water and mechanically stirred until completely dissolved. The calcium carbonate was added to the resorcinol solution with continued stirring until completely dissolved. The required volume of 37 wt. % formaldehyde solution and additional deionized water to give the total volume of 600 mL at 30% solids was added to the reactor, which was sealed and stirred for 30 min. This gel precursor solution was then poured over a 1 cm thick glass fiber mat laid in a casting container until the glass fiber mat was submerged. The commercial glass fiber mat, trade name KOBEMAT®, was procured from KOBE-cz s.r.o. (Brno-Country District, Czech Republic) and included needle-punched glass fibers, average fiber length of 50 mm and average fiber diameter of 12 μm. The cast gel precursor was held at about 85° C. for three days to gel. After the gel was set, the fiber-reinforced wet gel was removed from the casting container and submerged in acetone for three days at room temperature, with acetone exchanges every 12 hours. After solvent exchange, the gel was dried by 85° C. for two days under vacuum.

The thermal conductivity was measured at a mean temperature of 20° C. and 13.8 kPa pressure using a heat flow meter (HFM). Thermal conductivity of the glass fiber-reinforced resorcinol formaldehyde aerogel blankets of the present invention with the indicated R/C value are listed in Table 4.

TABLE 4

| Sample No | R/C | Thermal conductivity (mW/m · K) |
| --- | --- | --- |
| 1 | 100 | 31 |
| 2 | 400 | 29 |

Example 5

(Polyester Fiber-Reinforced Mixed-Catalyst Resorcinol Formaldehyde Aerogels)

Polyester fiber-reinforced resorcinol formaldehyde aerogels were produced in which the molar ratio of resorcinol to catalyst (R/C) in the gel precursor was 400, 500, 600, 650, or 700. The catalyst was a mixture of calcium carbonate and sodium carbonate at a Ca:Na weight ratio of 3(Ca):1(Na) or 1(Ca):1(Na). The total solids content in the gel precursors (i.e., resorcinol, formaldehyde, and carbonate) was at 20% w/v, 25% w/v, or 30% w/v. The molar ratio of resorcinol to formaldehyde (R/F) was fixed at 0.5.

For a chosen R/C ratio, the required resorcinol was placed in a sealable reactor with 50 mL of deionized water and mechanically stirred until completely dissolved. The calcium carbonate was added to the resorcinol solution with continued stirring until completely dissolved. The required volume of 37 wt. % formaldehyde solution and additional deionized water to give the total volume of 600 mL at 20%, 25%, or 30% solids was added to the reactor, which was sealed and stirred for 30 min. This gel precursor solution was then poured over a 0.5 cm thick polyester fiber mat laid in a casting container until the fiber mat was submerged. The polyester mat, trade name AB10, procured from Cytec® Process Materials (Heanor, Derbyshire, UK) included needle-punched polyester fibers, average fiber length of 64 mm and average fiber diameter of 180 μm. The cast gel precursor was held at about 85° C. for three days to gel. After three days, the fiber-reinforced wet gel was removed from the casting container and submerged in acetone for 3 days at room temperature, with acetone exchanges every 12 hours. After solvent exchange, the gel was dried by 85° C. for 2 days under vacuum.

Figure 7:
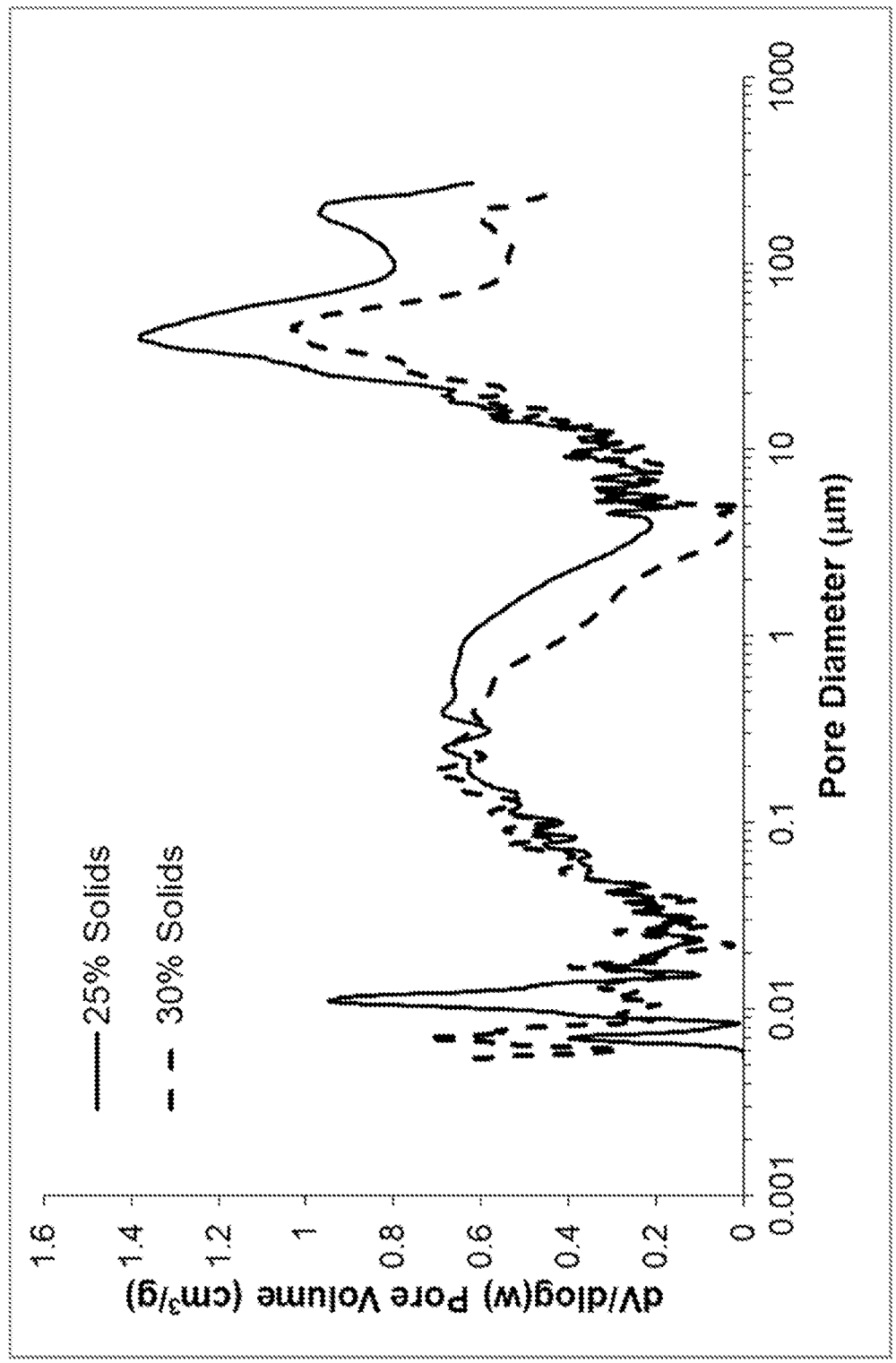
FIG. 7 shows the pore size distribution of the PET fiber-reinforced mixed catalyst resorcinol formaldehyde aerogel materials of the present invention at a catalyst mixture ratio of 1(Ca):1(Na), R/C 600, and 25% and 30% solids as measured by mercury intrusion porosimetry.
Figure 8:
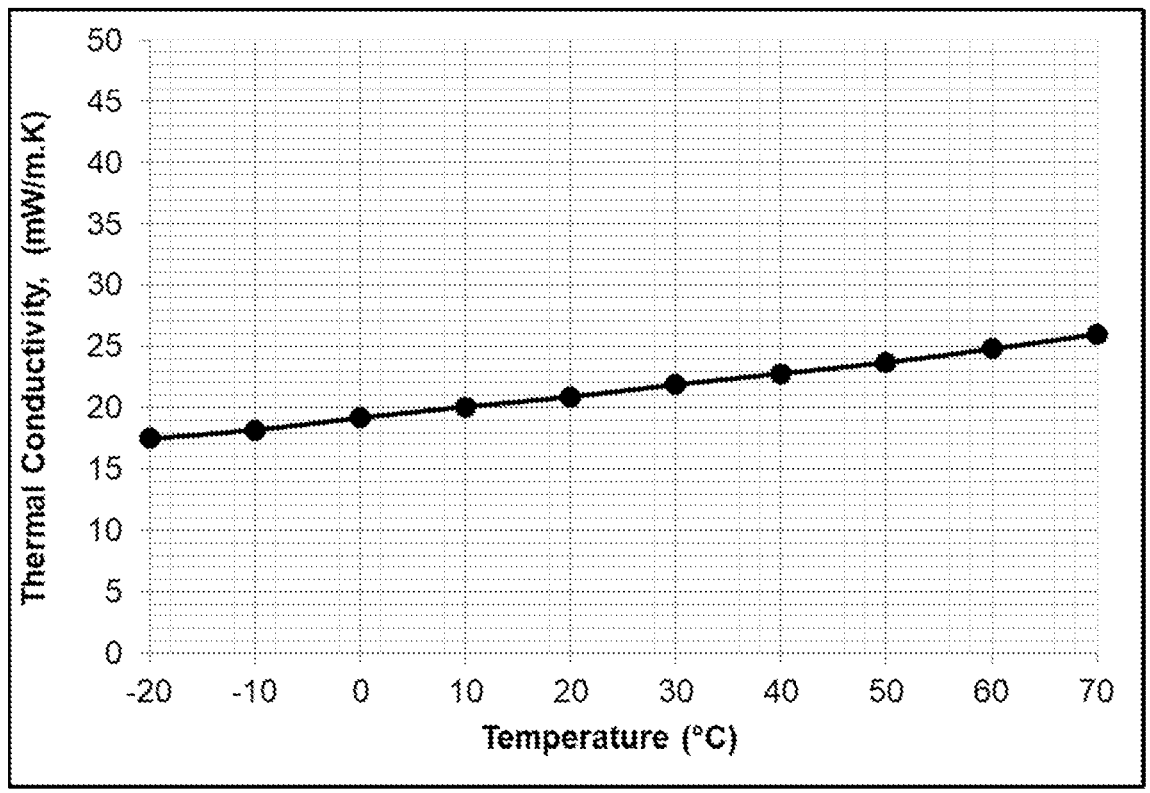
FIG. 8 shows is a graph of the relationship between temperature and thermal conductivity for the vacuum insulated panels using PET-reinforced mixed-catalyst resorcinol formaldehyde aerogel blankets of the present invention.

The thermal conductivity was measured at a mean temperature of 20° C. and 13.8 kPa pressure with a HFM. The thermal conductivity of PET fiber-reinforced mixed-catalyst resorcinol formaldehyde aerogel blankets with the indicated R/C value are presented in Table 5. The pore size distribution of the samples at a catalyst mixture ratio of 1(Ca):1(Na), R/C 600, and 25% and 30% solids as measured by mercury intrusion porosimetry (MIP) are presented in FIG. 7. MIP was able to measure pore diameters larger than 100 nm. FIG.

7 shows multi-modal pore size distributions, with substantial populations of pores larger than 100 nm.

TABLE 5

| Catalyst mixture ratio (w/w) | Solids content (%) | R/C | Thermal conductivity (mW/m · K) |
|---|---|---|---|
| 3(Ca):1(Na) | 20 | 400 | 28.2 |
| 3(Ca):1(Na) | 20 | 500 | 28.5 |
| 3(Ca):1(Na) | 30 | 400 | 26.2 |
| 3(Ca):1(Na) | 30 | 500 | 26.7 |
| 3(Ca):1(Na) | 30 | 600 | 28.6 |
| 1(Ca):1(Na) | 25 | 500 | 26.7 |
| 1(Ca):1(Na) | 25 | 600 | 25.3 |
| 1(Ca):1(Na) | 25 | 650 | 25.4 |
| 1(Ca):1(Na) | 25 | 700 | 25.9 |
| 1(Ca):1(Na) | 30 | 650 | 24.9 |
| 1(Ca):1(Na) | 30 | 700 | 24.5 |

Example 6

(Vacuum Insulation Panel Using Fiber-Reinforced Mixed-Catalyst Resorcinol Formaldehyde Aerogels)

Vacuum insulation panels (VIP) using fiber-reinforced resorcinol formaldehyde aerogels as a core were produced in which the polyester-reinforced mixed catalyst resorcinol formaldehyde aerogels were vacuum sealed in a polyester bag. Sealing at 60 mbar was achieved by subjecting the bagged blanket under vacuuming for 5 minutes and sealing at 50 mbar was reached by subjecting the bagged blanket under vacuuming for 12 hours.

The molar ratio of resorcinol to catalyst (R/C) in the gel precursor was 650. The catalyst was a mixture of calcium carbonate and sodium carbonate at a weight ratio of 1(Ca):1(Na). The total solids content in the gel precursors (i.e., resorcinol, formaldehyde, and carbonate) was at 30% w/v. The molar ratio of resorcinol to formaldehyde (R/F) was at 0.5. The polyester-reinforced resorcinol formaldehyde aerogels were produced following the same procedure as Example 5.

The thermal conductivity was measured at a mean temperature range of −20° C. to 70° C. and 13.8 kPa pressure with a heat flow meter (HFM). The thermal conductivity of vacuum insulation panels using PET fiber-reinforced mixed-catalyst resorcinol formaldehyde aerogel of the present invention with the indicated R/C value are presented in Table 6 and FIG.

TABLE 6

| Mean temperature (° C.) | Thermal conductivity (mW/m · K) |
|---|---|
| −20 | 17.5 |
| −10 | 18.2 |
| 0 | 19.2 |
| 10 | 20.1 |
| 20 | 20.9 |
| 30 | 21.9 |
| 40 | 22.8 |
| 50 | 23.7 |
| 60 | 24.8 |
| 70 | 26.0 |

Example 7

(Mechanical Properties of Polyester Fiber-Reinforced Resorcinol Formaldehyde Aerogels of the Present Invention)

Figure 9:
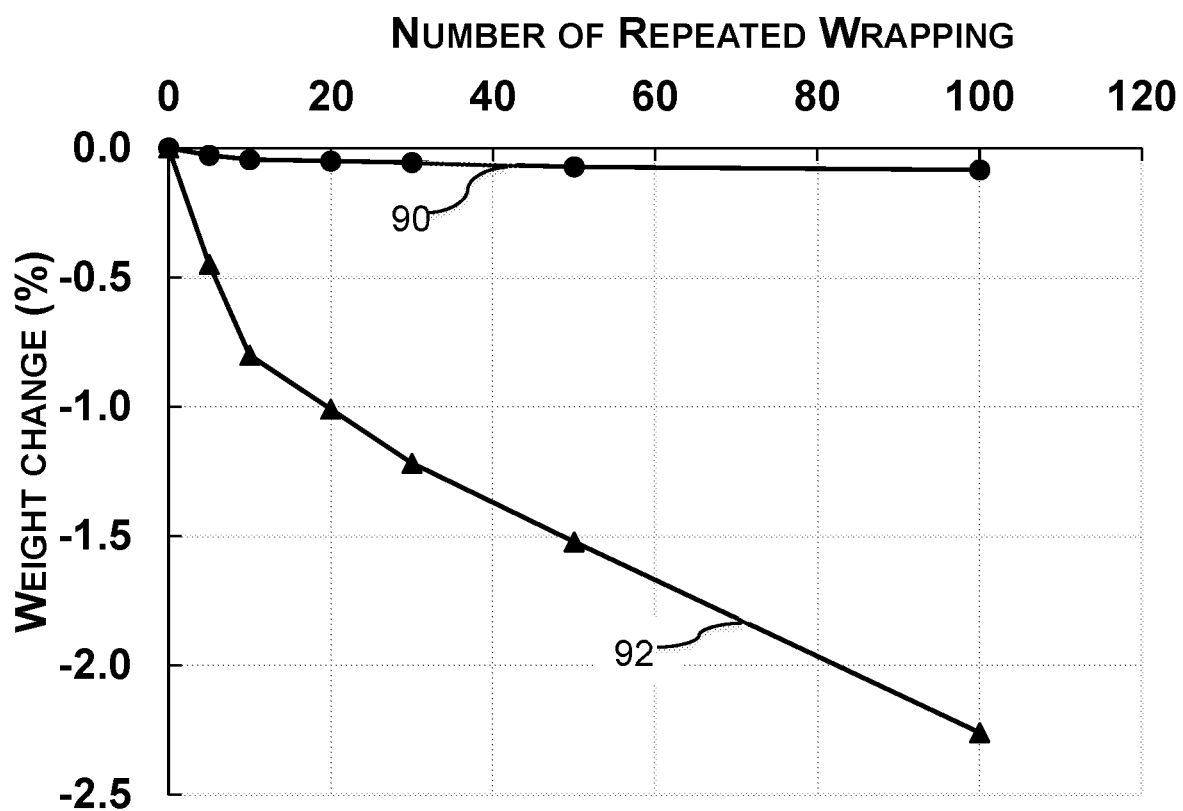
FIG. 9 shows is a graph of the relationship between number of repeated wrappings and weight change a PET-reinforced mixed-catalyst resorcinol formaldehyde aerogel blanket of the present invention a commercial silica gel aerogel blanket.

Polyester Fiber-reinforced organic polymer aerogels were produced by methods similar to those in Examples 3. The mechanical properties of the produced aerogels were measured in tension, flexure, and compression by following standard testing procedures ASTM D5035 and ASTM C165 at a temperature of 23° C. The mechanical results are summarized in Tables 7, 8 and 9 in comparison with the similar measurement obtained from a commercial silica aerogel based blanket. Table 7 lists tensile properties of the polyester fiber-reinforced resorcinol formaldehyde aerogel blanket of the present invention. Table 8 lists flexure properties of the polyester fiber-reinforced resorcinol formaldehyde aerogel blanket of the present invention. Table 9 lists compressive properties of the polyester fiber-reinforced resorcinol formaldehyde aerogel blanket of the present invention. Commercial silica aerogel based blanket is subject to severe dustiness when the blanket is mechanical handled. Since the polyester-reinforced resorcinol formaldehyde aerogel blanket of the present invention exhibits significantly better mechanical performance, the dustiness was expected to be reduced. To demonstrate this, the aerogel blanket of the present invention and a commercial silica gel aerogel blanket were used to repeatedly fully wrap around a 20 cm long steel pipe with an outer diameter of 10 cm. The weight change after each wrapping was measured using a microbalance and the weight loss as a function of the number of repeated wrapping is presented in FIG. 9. Data line 90 is the polyester-reinforced resorcinol formaldehyde aerogel blanket of the present invention. Data line 92 is the commercial silica aerogel blanket. From the data, it was determined that the aerogel blanket of the present invention a minimal weight change while the commercial aerogel blanket had a significant weight change.

TABLE 7

| | Machine UTS (MPa) | Machine Modulus (MPa) | Cross UTS (MPa) | Cross Modulus (MPa) |
|---|---|---|---|---|
| Example 7 Blanket | 4.9 | 57.9 | 2.1 | 41.8 |
| Commercial Silica Aerogel Blanket | 0.4 | 15.6 | 0.1 | 6.1 |

TABLE 8

| | Stress at 10% Strain (MPa) | Stress at 10% Strain (MPa) |
|---|---|---|
| Example 7 Blanket | 1.56 | 2.22 |
| Commercial Silica Aerogel Blanket | 0.02 | 0.05 |

TABLE 9

| | Stress at 10% strain (MPa, 23° C.) | Stress at 20% strain (MPa, 23° C.) | Modulus (MPa, 23° C.) |
|---|---|---|---|
| Example 7 Blanket | 0.85 | 1.75 | 6.40 |
| Commercial Silica Aerogel Blanket | 0.01 | 0.11 | 0.33 |

The invention claimed is:

1. A fiber-reinforced aerogel comprising a porous organic polymer matrix and fibers comprised in the porous organic polymer matrix, wherein the aerogel comprises:
   a thermal conductivity of 10 mW/m K to 60 mW/m K at a temperature of 20° C.;
   at least a bimodal pore size distribution with a first mode of pores having an average pore size of 3 nanometers (nm) to 50 nm and a second mode of pores having an average pore size of greater than 50 nm; and
   a thickness of 5 millimeters (mm) or less and is capable of being rolled up into a roll,
   wherein the fibers form a woven fiber matrix.

2. The fiber-reinforced aerogel of claim 1, wherein the second mode of pores has an average pore size greater than 50 nm to 10 μm.

3. The fiber-reinforced aerogel of claim 1, wherein a weight ratio of the porous organic polymer matrix to the fibers is 50:1 to 65:1.

4. The fiber-reinforced aerogel of claim 1, wherein the porous organic polymer matrix comprises resorcinol formaldehyde, phenol formaldehyde, polyimide, polyamine, polyamide, poly(amide-imide), poly(amic amide), poly(ether imide), polyphenol, polyalcohol, polyvinyl butryal, polyurethane, polyurea, polycarbonate, polyester, polyether, polyacid, or any combination thereof.

5. The fiber-reinforced aerogel of claim 4, wherein the porous organic polymer matrix comprises the resorcinol formaldehyde.

6. The fiber-reinforced aerogel of claim 4, wherein the porous organic polymer matrix comprises the polyimide.

7. The fiber-reinforced aerogel of claim 1, wherein the fibers comprise vegetable fibers, wood fibers, animal fibers, mineral fibers, or biological fibers, or any combination thereof.

8. The fiber-reinforced aerogel of claim 1, wherein the fibers comprise rayon fibers, bamboo fibers, diacetate fibers, triacetate fibers, polyester fibers, or aramid fibers, or any combination thereof.

9. The fiber-reinforced aerogel of claim 1, wherein the fibers are polyester fibers or polyethylene terephthalate fibers or a combination thereof.

10. The fiber-reinforced aerogel of claim 1, wherein the fibers comprise metal fibers, carbon fibers, carbide fibers, glass fibers, mineral fibers, or basalt fibers, or any combination thereof.

11. The fiber-reinforced aerogel of claim 1, wherein the fibers comprise glass fibers.

12. The fiber-reinforced aerogel of claim 1, wherein the fibers comprise thermoplastic polymer fibers or thermoset polymer fibers, or a combination thereof.

13. The fiber-reinforced aerogel of claim 12, wherein the thermoplastic polymer fibers are fibers of polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone (PEKK), acrylonitrile butyldiene styrene (ABS), or polyphenylene sulfide (PPS), or co-polymers thereof, or blends thereof.

14. The fiber-reinforced aerogel of claim 12, wherein the thermoset polymer fibers are fibers of polyaramid, polyimide, polybenzoxazole, or polyurethane, or any combination thereof.

15. The fiber-reinforced aerogel of claim 1, wherein the porous organic polymer matrix is cross-linked.

16. The fiber-reinforced aerogel of claim 1, wherein the aerogel has a density of 0.1 g/cm3 to 0.5 g/cm3.

17. The fiber-reinforced aerogel of claim 1, wherein the aerogel has a pore volume of greater than 2 cm3/g or a surface area of at least 150 m2/g.

18. The fiber-reinforced aerogel of claim 1, wherein the aerogel has a thickness of 0.5 mm to 5 mm.

19. The fiber-reinforced aerogel of claim 1, wherein the aerogel has a thickness of 0.5 mm to 2 mm.

20. The fiber-reinforced aerogel of claim 1, wherein the aerogel site has a flex fatigue of at least 100,000 cycles to failure or a tensile strength of at least 2 MPa.

21. The fiber-reinforced aerogel of claim 1, wherein the aerogel has less than 0.5 weight percent change when wrapped around a pipe having a diameter of 10 centimeters (cm).

* * * * *